United States Patent
Nakadai et al.

(10) Patent No.: US 9,208,782 B2
(45) Date of Patent: Dec. 8, 2015

(54) SPEECH PROCESSING DEVICE, SPEECH PROCESSING METHOD, AND SPEECH PROCESSING PROGRAM

(71) Applicant: HONDA MOTOR CO., LTD., Tokyo (JP)

(72) Inventors: Kazuhiro Nakadai, Wako (JP); Keisuke Nakamura, Wako (JP); Randy Gomez, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/265,612

(22) Filed: Apr. 30, 2014

(65) Prior Publication Data

US 2015/0012268 A1 Jan. 8, 2015

(30) Foreign Application Priority Data

Jul. 8, 2013 (JP) ................................. 2013-143079

(51) Int. Cl.
*G10L 15/20* (2006.01)
*G10L 15/00* (2013.01)
*G10L 21/0208* (2013.01)

(52) U.S. Cl.
CPC ....... *G10L 15/20* (2013.01); *G10L 2021/02082* (2013.01)

(58) Field of Classification Search
CPC ................. G10L 2021/02082; G10L 21/0208; G10L 15/063; G10L 15/20
USPC ......... 704/216, 217, 226, 233, 237, 238, 250, 704/263, 231
See application file for complete search history.

(56) References Cited

U.S. PATENT DOCUMENTS

2010/0211382 A1\* 8/2010 Sugiyama ..................... 704/205

\* cited by examiner

*Primary Examiner* — Thierry L Pham
(74) *Attorney, Agent, or Firm* — Squire Patton Boggs (US) LLP

(57) ABSTRACT

A speech processing device includes a reverberation characteristic selection unit configured to correlate correction data indicating a contribution of a reverberation component based on a corresponding reverberation characteristic with an adaptive acoustic model which is trained using reverbed speech to which a reverberation based on the corresponding reverberation characteristic is added for each of reverberation characteristics, to calculate likelihoods based on the adaptive acoustic models for a recorded speech, and to select correction data corresponding to the adaptive acoustic model having the calculated highest likelihood, and a dereverberation unit configured to remove the reverberation component from the speech based on the correction data.

3 Claims, 11 Drawing Sheets

FIG. 11

| METHOD | 0.5m | 1.0m | 1.5m | 2.0m | 2.5m |
|---|---|---|---|---|---|
| A | 79.1 | 73.2 | 57.6 | 35.3 | 20.6 |
| B | 80.3 | 76.9 | 65.6 | 49.6 | 37.7 |
| C | 81.2 | 78.3 | 71.3 | 55.7 | 46.1 |
| D | 81.6 | 79.4 | 73.1 | 57.2 | 50.8 |
| E | 82.3 | 81.2 | 75.8 | 60.7 | 55.4 |
| F | 82.3 | 81.4 | 76.0 | 61.3 | 56.1 |

FIG. 12

| METHOD | 0.5m | 1.0m | 1.5m | 2.0m | 2.5m |
|---|---|---|---|---|---|
| A | 31.8 | 15.6 | 0.4 | -8.1 | -20.2 |
| B | 41.9 | 33.4 | 20.6 | 10.0 | 0.9 |
| C | 45.0 | 38.3 | 26.9 | 16.1 | 7.4 |
| D | 46.3 | 41.1 | 32.5 | 23.5 | 16.5 |
| E | 48.4 | 43.8 | 36.7 | 28.4 | 22.1 |
| F | 48.9 | 44.2 | 37.2 | 29.1 | 22.7 |

SPEECH PROCESSING DEVICE, SPEECH PROCESSING METHOD, AND SPEECH PROCESSING PROGRAM

CROSS REFERENCE TO RELATED APPLICATIONS

Priority is claimed on Japanese Patent Application No. 2013-143079, filed on Jul. 8, 2013, the contents of which are entirely incorporated herein by reference.

BACKGROUND OF THE INVENTION

1. Field of the Invention

The present invention relates to a speech processing device, a speech processing method, and a speech processing program.

2. Description of Related Art

A sound emitted in a room is repeatedly reflected by walls or installed objects which cause reverberations. When reverberations are added, frequency characteristics vary from those of an original speech, and thus a speech recognition rate may decrease. In addition, since previously-uttered speech overlaps with currently-uttered speech, an articulation rate may decrease. Therefore, reverberation reducing techniques of reducing reverberation components from speech recorded in reverberation environments have been developed.

For example, Japanese Patent Publication No. 4396449 (Patent Document 1) describes a dereverbing method of acquiring a transfer function of a reverberation space using an impulse response of a feedback path adaptively identified by an inverse filter processing unit and reconstructing a sound source signal by dividing a reverberation speech signal by the magnitude of the transfer function. In the dereverbing method described in Patent Document 1, the impulse response indicating reverberation characteristics is estimated, but since the reverberation time ranges from 0.2 to 2.0 seconds which is relatively long, the computational load excessively increases and a processing delay becomes remarkable. Accordingly, application to speech recognition has not been spread.

H-G. Hirsch, Harald Finster, A New Approach for the Adaptation of HMMs to Reverberation and Background Noise, Speech Communication, Elsevier, 2008, 244-263 (Non-patent Document 1) describes a method of preparing acoustic models trained under reverberation environments having different reverberation times in advance and searching for an acoustic model having the highest likelihood in an environment in which speech is recorded. The reverberation time is a time until a reverberation intensity relative to a maximum value is attenuated to a predetermined intensity. In this method, speech recognition is performed using the searched acoustic model.

However, in the method described in Non-patent Document 1, the positional relationship between a sound source and a sound collection unit is not considered. Meanwhile, the reverberation time in a certain reverberation space is almost constant, but the ratio of the intensity of a reverberation component and the intensity of a direct sound varies depending on the distance from the sound source to the sound collection unit. Accordingly, it cannot be necessarily said that an acoustic model corresponding to the reverberation time is selected, and the speech recognition accuracy may decrease.

SUMMARY OF THE INVENTION

The present invention is made in consideration of the above-mentioned circumstances and provides a speech processing device, a speech processing method, and a speech processing program which can realize reverberation reduction for improving speech recognition accuracy without measuring a reverberation characteristic.

(1) In order to solve the above-mentioned problems, according to an aspect of the present invention, a speech processing device is provided including: a reverberation characteristic selection unit configured to correlate correction data indicating a contribution of a reverberation component based on a corresponding reverberation characteristic with an adaptive acoustic model which is trained using reverbed speech to which a reverberation based on the corresponding reverberation characteristic is added for each of reverberation characteristics, to calculate likelihoods based on the adaptive acoustic models for a recorded speech, and to select correction data corresponding to the adaptive acoustic model having the calculated highest likelihood; and a dereverberation unit configured to remove the reverberation component from the speech based on the correction data.

(2) In the speech processing device according to (1), the reverberation characteristics may differ in the contribution of a component which is inversely proportional to a distance between a sound collection unit configured to record speech from a sound source and the sound source.

(3) In the speech processing device according to (2), the reverberation characteristic selection unit may correlate distance data indicating the distances corresponding to the reverberation characteristics with the correction data and the adaptive acoustic models and may select the distance data corresponding to the adaptive acoustic model having the calculated highest likelihood.

(4) The speech processing device according to (3) may further include: an acoustic model prediction unit configured to predict an acoustic model corresponding to the distance indicated by the distance data selected by the reverberation characteristic selection unit from a first acoustic model trained using reverbed speech to which a reverberation corresponding to the reverberation characteristic based on a predetermined distance is added and a second acoustic model trained using speech in an environment in which reverberations are negligible; and a speech recognition unit configured to perform a speech recognizing process on the speech using the acoustic model predicted by the acoustic model prediction unit.

(5) According to another aspect of the present invention, a speech processing method is provided including: a reverberation characteristic selecting step of calculating a likelihood for a recorded speech based on an adaptive acoustic model trained using reverbed speech to which a reverberation based on a corresponding reverberation characteristic is added for each of reverberation characteristics and selecting correction data corresponding to the adaptive acoustic model having the calculated highest likelihood from a storage unit in which the adaptive acoustic model and the correction data are stored in correlation for each of the reverberation characteristics; and a dereverbing step of removing a reverberation component from the speech based on the correction data.

(6) According to another aspect of the present invention, a non-transitory computer-readable storage medium is provided including a speech processing program causing a computer of a speech processing device to perform: a reverberation characteristic selecting process of calculating a likelihood for a recorded speech based on an adaptive acoustic model trained using reverbed speech to which a reverberation based on a corresponding reverberation characteristic is added for each of reverberation characteristics and selecting correction data corresponding to the adaptive acoustic model having the calculated highest likelihood from a storage unit in which the adaptive acoustic model and the correction data are stored in correlation for each of the reverberation characteristics; and a dereverbing process of removing a reverberation component from the speech based on the correction data.

According to the configuration of (1), (5), or (6), the correction data indicating the reverberation characteristic based on the adaptive acoustic model having the highest likelihood is selected for a recorded speech and the reverberation component indicated by the correction data is removed from the speech. Accordingly, it is possible to realize reverberation reduction for improving speech recognition accuracy without measuring a reverberation characteristic.

According to the configuration of (2), since the contributions of direct sounds emitted from different sound sources depending on the distance from the sound collection unit to the sound source are considered, it is possible to improve the reverberation reduction accuracy.

According to the configuration of (3), it is possible to estimate the distance from the sound collection unit to the sound source by selecting the distance corresponding to the selected adaptive acoustic model.

According to the configuration of (4), an acoustic model corresponding to an reverberation environment is predicted from the first acoustic model and the second acoustic model based on the selected distance. Since the speech recognizing process is performed using the predicted acoustic model, it is possible to improve the speech recognition accuracy.

BRIEF DESCRIPTION OF THE DRAWINGS

FIG. 11 is a diagram illustrating an example of a word recognition rate for each processing method.

FIG. 12 is a diagram illustrating another example of the word recognition rate for each processing method.

DETAILED DESCRIPTION OF THE INVENTION

Hereinafter, an embodiment of the present invention will be described with reference to the accompanying drawings.

Figure 1:
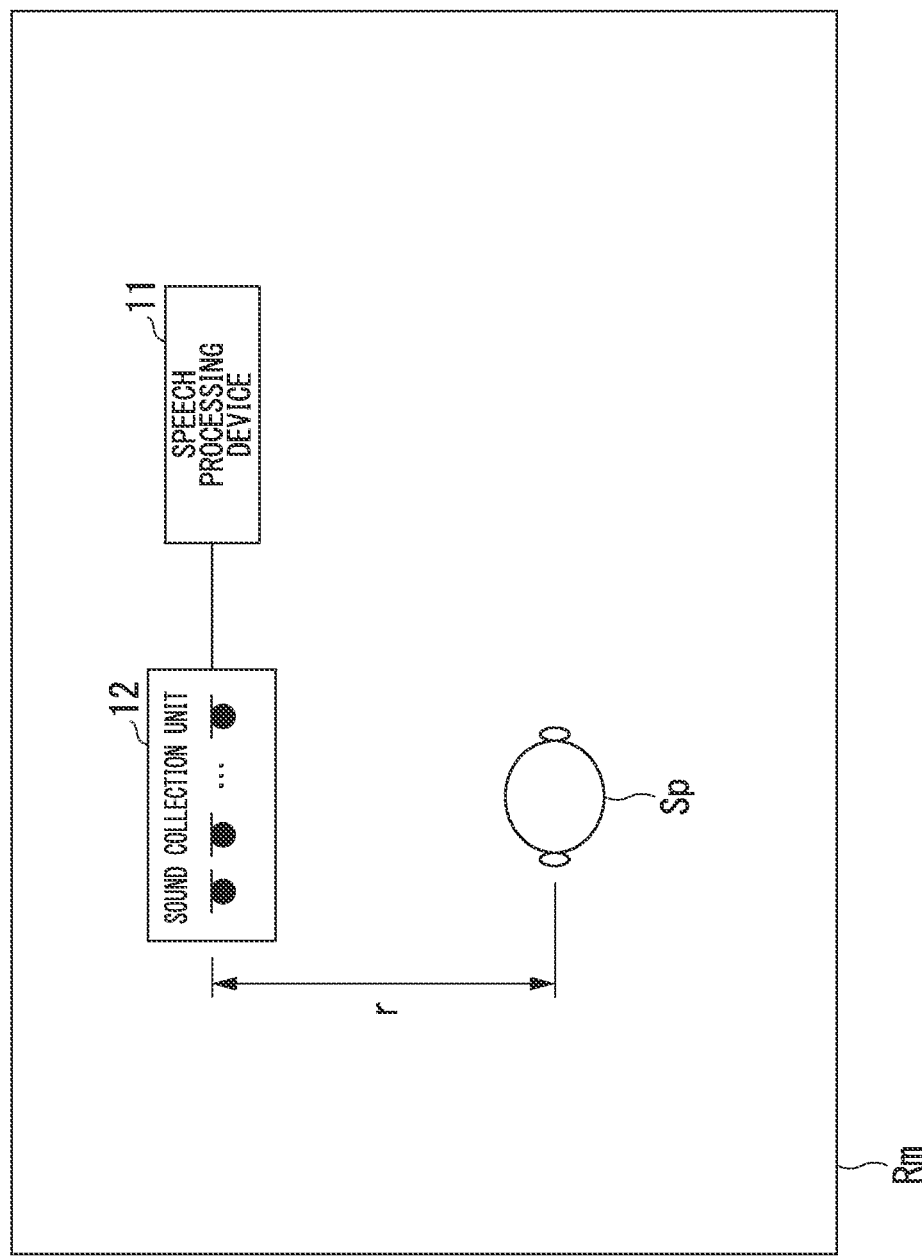
FIG. 1 is a plan view illustrating an arrangement example of a speech processing device according to an embodiment of the present invention.

FIG. 1 is a plan view illustrating an arrangement example of a speech processing device 11 according to this embodiment.

This arrangement example shows that a speaking person Sp is located at a position separated by a distance r from the center of a sound collection unit 12 (to be described later) in a room Rm as a reverberation environment and the speech processing device 11 is connected to the sound collection unit 12. The room Rm includes inner walls reflecting an arriving sound wave. The sound collection unit 12 records speech directly arriving from the speaking person Sp as a sound source and speech reflected by the inner walls. The speech directly arriving from the sound source and the reflected speech are referred to as a direct sound and a reflection, respectively. A section of which the elapsed time after the direct sound is emitted is shorter than a predetermined time (for example, equal to or less than about 30 ms), the number of reflection times is relatively small, and reflection patterns are distinguished from each other in the reflection is referred to as an early reflection. A section of which the elapsed time is longer than that of the early reflection, the number of reflection times is larger, and reflection patterns are not distinguished from each other in the reflection is referred to as a late reflection, a late reverberation, or simply a reverberation. The time used to distinguish the early reflection and the late reflection varies depending on the size of the room Rm, but for example, a frame length as a process unit in speech recognition corresponds to the time. This is because the direct sound processed in a previous frame and the late reflection subsequent to the early reflection affect the processing of a current frame.

In general, as the sound source gets close to the sound collection unit 12 (as the distance r becomes smaller), the direct sound from the sound source occupies a larger ratio and the ratio of the reverberation becomes relatively smaller. The lower a component of the reverberation components has, the larger the ratio of the component becomes. In the description below, speech, of which a reverberation component is small enough to ignore because the speaking person Sp is close to the sound collection unit 12, out of speech recorded by the sound collection unit 12 may be referred to as close-talking speech. That is, the close-talking speech is an example of clean speech which is speech not including any reverberation component or including a reverberation component small enough to ignore. In contrast, speech which significantly includes a reverberation component because the speaking person Sp is spaced apart from the sound collection unit 12 may be referred to as distant-talking speech. Therefore, the term "distant" is not limited to a large distance r.

The speech processing device 11 generates correction data indicating a contribution of a reverberation component based on the corresponding reverberation characteristic and an adaptive acoustic model trained using reverbed speech to which the reverberation based on the corresponding reverberation characteristic is added for each of reverberation characteristics, and correlates and stores the correction data and the adaptive acoustic models. The speech processing device 11 calculates likelihoods based on the adaptive acoustic models for a recorded speech, selects the correction data corresponding to the adaptive acoustic model having the calculated highest likelihood, and removes the reverberation component from the speech based on the selected correction data. The speech processing device 11 performs a speech recognizing process on the speech from which the reverberation component has been removed.

In the reverberation characteristics, the contribution of a component inversely proportional to the distance from the sound collection unit 12 to the sound source varies. There are characteristics that the closer the sound source gets to the sound collection unit 12, the lower the ratio of reverberation becomes and that the lower the frequency becomes, the lower the ratio of reverberation becomes. The speech processing device 11 combines the reverberation characteristics having such characteristics and uses the combined reverberation characteristic.

Accordingly, it is possible to realize reverberation reduction for improving speech recognition accuracy without sequentially measuring reverberation characteristics.

The sound collection unit 12 records sound signals of one or more (N, where N is an integer greater than 0) channels and transmit the recorded sound signals of N channels to the speech processing device 11. N microphones are arranged at different positions in the sound collection unit 12. The sound collection unit 12 may transmit the recorded sound signals of N channels in a wireless manner or a wired manner. When N is greater than 1, the sound signals have only to be synchronized with each other between the channels at the time of transmission. The sound collection unit 12 may be fixed or may be installed in a moving object such as a vehicle, an aircraft, or a robot so as to be movable.

The configuration of the speech processing device 11 according to this embodiment will be described below.

Figure 2:
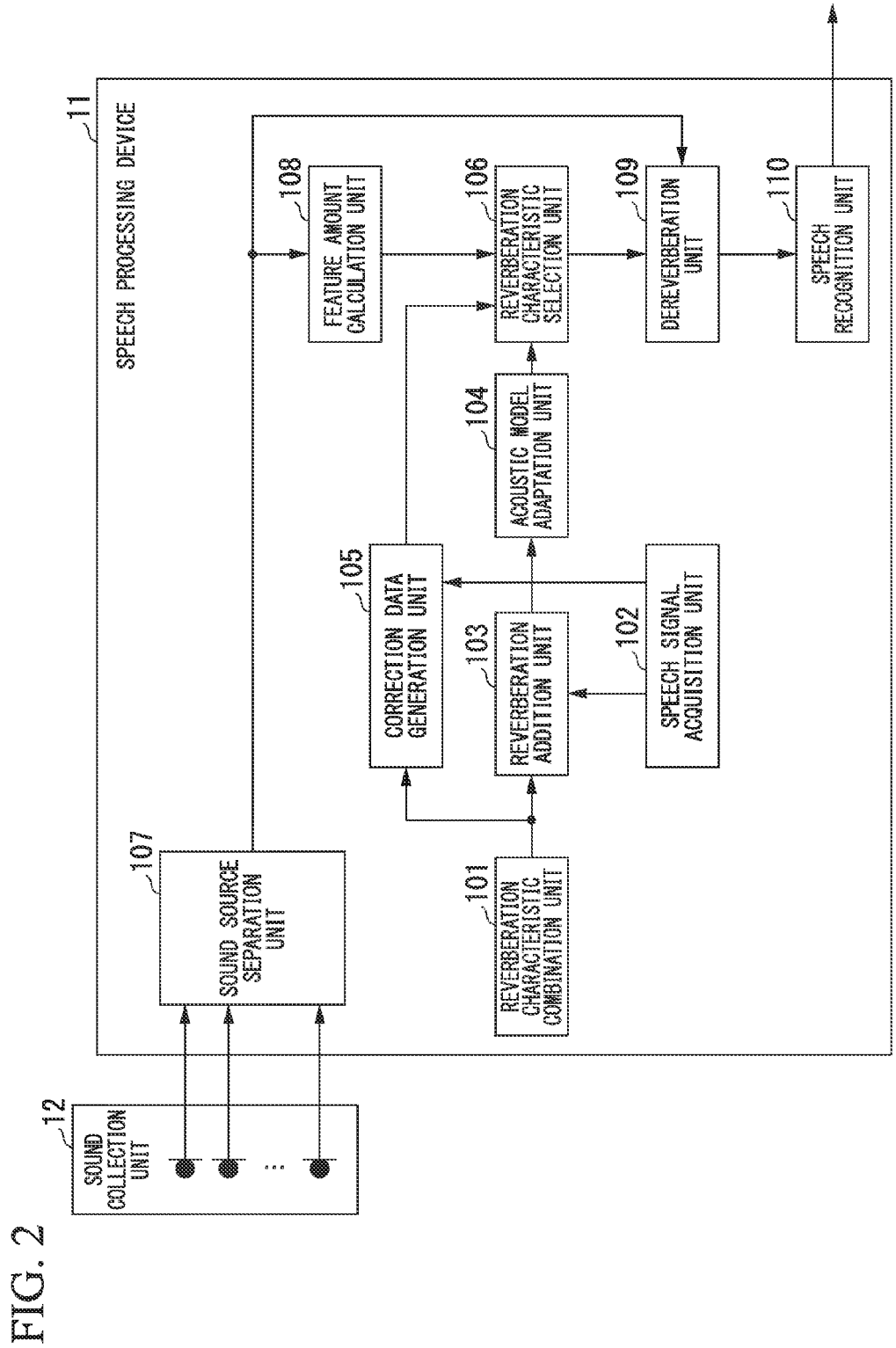
FIG. 2 is a block diagram illustrating a configuration of the speech processing device according to the embodiment.

FIG. 2 is a block diagram illustrating the configuration of the speech processing device 11 according to this embodiment.

The speech processing device 11 includes a reverberation characteristic combination unit 101, a speech signal acquisition unit 102, a reverberation unit 103, an acoustic model adaptation unit 104, a correction data generation unit 105, a reverberation characteristic selection unit 106, a sound source separation unit 107, a feature amount calculation unit 108, a dereverberation unit 109, and a speech recognition unit 110.

The reverberation characteristic combination unit 101 combines reverberation characteristic data indicating the reverberation characteristic $A'_{[r]}{}^{k\Delta}(\omega, r')$ corresponding to a target distance r' based on a predetermined reverberation model. Here, k represents an integer indicating a degree of contribution of the inversely-proportional component, Δ represents a real number indicating a width of the degree of contribution of k, and ω represents the frequency. In addition, k has a value of 1 to K (where K is a predetermined integer greater than 1, for example, 5). Here, k and Δ are determined in advance by performing confirmation of operations or preliminary training. The reverberation characteristic combination unit 101 outputs the combined reverberation characteristic data to the reverberation unit 103 and the correction data generation unit 105. In the reverberation model, it is assumed that the reverberation characteristic $A'_{[r]}{}^{k\Delta}(\omega, r')$ includes a component inversely proportional to the distance r'. The process (reverberation characteristic combining process) of combining the reverberation characteristic data will be described later.

The speech signal acquisition unit 102 acquires a sound signal of clean speech and outputs the acquired speech signal to the reverberation unit 103 and the correction data generation unit 105. The speech signal acquisition unit 102 is, for example, a database in which speech signals indicating clean speech are stored. The speech signal acquisition unit 102 may be a speech interface to which a speech signal is input from the outside of the speech processing device 11.

The reverberation unit 103 transforms the speech signals in the time domain input from the speech signal acquisition unit 102 to frequency-domain coefficients s(ω) in the frequency domain for each predetermined time interval (for example, 10 ms) and generates frequency-domain coefficient data indicating the frequency-domain coefficients. The reverberation unit 103 calculates frequency-domain coefficients $s_{[r]}{}^{k\Delta}(\omega, r')$ of speech (reverbed speech) to which reverberations are added by multiplying the transformed frequency-domain coefficients by the reverberation characteristic $A'_{[r]}{}^{k\Delta}(\omega, r')$ indicated by the reverberation characteristic data input from the reverberation characteristic combination unit 101. The reverberation unit 103 outputs the reverbed frequency-domain coefficient data indicating the calculated frequency-domain coefficients $s_{[r]}{}^{k\Delta}(\omega, r')$ to the acoustic model adaptation unit 104.

The acoustic model adaptation unit 104 includes a storage unit (not illustrated) in which an acoustic model $\pi^{(c)}$ trained to maximize the likelihood using clean speech is stored in advance. The acoustic model $\pi^{(c)}$ is, for example, a Gaussian mixture model (GMM). The acoustic model adaptation unit 104 generates an adaptive acoustic model $\pi_{[r]}{}^{k\Delta}$ which has the highest likelihood from the stored acoustic models $\pi^{(c)}$ using the frequency-domain coefficients $s_{[r]}{}^{k\Delta}(\omega, r')$ indicated by the reverbed frequency-domain coefficient data input from the reverberation unit 103.

The acoustic model adaptation unit 104 uses, for example, a maximum likelihood linear regression (MLLR) method to generate the adaptive acoustic model $\pi_{[r]}{}^{k\Delta}$. Accordingly, the adaptive acoustic model $\pi_{[r]}{}^{k\Delta}$ can be generated using a relatively small amount of training data.

The acoustic model adaptation unit 104 stores the generated adaptive acoustic model $\pi_{[r]}{}^{k\Delta}$ in a reverberation model storage unit 1061 (FIG. 5) of the reverberation characteristic selection unit 106. The acoustic model will be described later.

The correction data generation unit 105 calculates weighting parameters $\delta_{b,[r]}{}^{k\Delta}$ for each sound source in the predetermined frequency bands b based on the reverberation characteristic data input from the reverberation characteristic combination unit 101. Here, b is an integer between 1 and B. B is an integer greater than 1 indicating the number of predetermined frequency bands. The weighting parameter $\delta_{b,[r]}{}^{k\Delta}$ is an index indicating a ratio of power of the late reflection to the power of the reverbed speech.

The correction data generation unit 105 calculates the weighting parameters $\delta_{b,[r]}{}^{k\Delta}$ so as to minimize the difference between the power of the late reflection corrected using the weighting parameters $\delta_{b,[r]}{}^{k\Delta}$ and the power of the reverbed speech. The correction data generation unit 105 stores the correction data indicating the calculated weighting parameters $\delta_{b,[r]}{}^{k\Delta}$ in the reverberation model storage unit 1061 (FIG. 5) of the reverberation characteristic selection unit 106 in correlation with the adaptive acoustic models $\pi_{[r]}{}^{k\Delta}$. The configuration of the correction data generation unit 105 will be described later.

The reverberation characteristic selection unit 106 calculates the likelihood $P(T[u']|\pi_{[r]}{}^{k\Delta})$ of the sound feature amount T[u'] indicated by the feature amount data input from the feature amount calculation unit 108 for each acoustic model $\pi_{[r]}{}^{k\Delta}$ stored in the reverberation model storage unit 1061. The reverberation characteristic selection unit 106 selects the acoustic model $\pi_{[r]}{}^{k\Delta}$ in which the calculated likelihood $P(T[u']|\pi_{[r]}{}^{k\Delta})$ is the highest and reads the correction data corresponding to the selected acoustic model $\pi_{[r]}{}^{k\Delta}$ from the reverberation model storage unit 1061. The weighting parameter $\delta_{b,[r]}{}^{k\Delta}$ indicated by the read correction data is a coefficient obtained based on the reverberation characteristic $A'_{[r]}{}^{k\Delta}(\omega, r')$ as described above. The reverberation characteristic selection unit 106 outputs the read correction data to the dereverberation unit 109. The configuration of the reverberation characteristic selection unit 106 will be described later.

The sound source separation unit 107 performs a sound source separating process on the sound signals of N channels input from the sound collection unit 12 to separate the sound signals into sound signals of one or more sound sources. The sound source separation unit 107 outputs the separated sound signals of the sound sources to the feature amount calculation unit 108 and the dereverberation unit 109.

The sound source separation unit 107 uses, for example, a geometric-constrained high order decorrelation-based source separation (GHDSS) method as the sound source separating process. The GHDSS method is a kind of blind deconveolution process. The GHDSS method will be described later. The sound source separation unit 107 may use another sound source separating method, for example, an adaptive beam forming method of estimating a sound source direction and controlling directivity so as to maximize sensitivity in the estimated sound source direction, instead of the GHDSS method. The sound source separation unit 107 may use a multiple signal classification (MUSIC) method to estimate the sound source direction.

The feature amount calculation unit 108 calculates sound feature amounts T(u') of the sound signals input from the sound source separation unit 107 for each predetermined time interval (for example, 10 ms). The sound feature amount is, for example, a combination of a static Mel-scale log spectrum (static MSLS), a delta MSLS, and single delta power. The combination of coefficients is referred to as a feature vector.

The feature amount calculation unit 108 outputs the feature amount data indicating the calculated sound feature amounts T(u') to the reverberation characteristic selection unit 106.

The dereverberation unit 109 separates the sound signals input from the sound source separation unit 107 into components of frequency bands b (frequency components) and corrects the amplitude of each separated frequency component using the weighting parameter $\delta_{b,[r]}^{k\Delta}$ indicated by the correction data input from the reverberation characteristic selection unit 106. Accordingly, the late reflection component which is part of the reverberations is removed. The dereverberation unit 109 combines the band components of which the amplitude is corrected over the frequency bands b and generates a dereverbed speech signal indicating the speech (dereverbed speech) from which the reverberation is removed. The dereverberation unit 109 does not change the phases at the time of correcting the amplitudes of the input sound signals. The dereverberation unit 109 outputs the generated dereverbed speech signal to the speech recognition unit 110.

The dereverberation unit 109 calculates the amplitudes |e(ω, t)| of the dereverbed speech signals so as to satisfy, for example, Expression (1) at the time of correcting the amplitudes.

$$|e(\omega,t)|^2 = |r(\omega,t)|^2 - \delta_{b,[r]}^{k\Delta}|r(\omega,t)|^2 \text{ (if } |r(\omega,t)|^2 - \delta_{b,[r]}^{k\Delta}|r(\omega,t)|^2 \text{ is greater than 0)}$$

$$|e(\omega,t)|^2 = \beta|r(\omega,t)|^2 \text{ (otherwise)} \quad (1)$$

In Expression (1), r(ω, t) represents frequency-domain coefficients of the input sound signals. Through the use of the process indicated by the upper part of Expression (1), the late reflection component is removed from the power of the sound signals. In the lower part of Expression (1), β is a flooring coefficient. Here, β has a predetermined positive minute value (for example, 0.05) closer to 0 than 1. In this manner, by providing the term of $\beta|r(\omega, t)|^2$ and maintaining the least amplitude in the dereverbed speech signals, it is difficult to detect abnormal noise.

The speech recognition unit 110 performs a speech recognizing process on the dereverbed speech signals input from the dereverberation unit 109 to recognize speech details (for example, a text including words and sentences), and outputs recognition data indicating the recognized speech details to the outside.

Here, the speech recognition unit 110 calculates sound feature amounts of the dereverbed speech signals for each predetermined time interval (for example, 10 ms). The sound feature amount is, for example, a combination of a static Mel-scale log spectrum (static MSLS), a delta MSLS, and single delta power, for example, which are the same as the feature amounts calculated by the feature amount calculation unit 108.

The speech recognition unit 110 recognizes phonemes using a predetermined acoustic model λ set for the calculated sound feature amounts. The acoustic model λ is, for example, a continuous hidden Markov model (continuous HMM). The continuous HMM is a model in which an output distribution density is a continuous function, and the output distribution density is weight-added with normal distributions as a basis. The acoustic model λ may be trained so that the likelihood is the maximum using clean speech.

The speech recognition unit 110 recognizes the speech details from a phoneme sequence including the recognized phonemes using a predetermined language model. The language model is a statistical model used to recognize words or sentences from the phoneme sequence.

Reverberation Characteristic Combining Process

A reverberation characteristic combining process in the reverberation characteristic combination unit 101 will be described below.

The reverberation characteristic combination unit 101 determines a reverberation transfer function (RTF) A'(ω, r') corresponding to a distance r', for example, using Expressions (2) and (3). The RTF is a coefficient indicating a ratio of reverberation power to a direct sound power for each frequency ω and is an index of reverberation characteristics.

$$A'(\omega,r') = f(r') \cdot A(\omega,r) \quad (2)$$

In Expression (2), f(r') is a gain dependent on the distance r'. A(ω, r) represents an RTF measured in advance for a sound source located at a distance r. The distance r' is a distance as a target (target distance) and is represented to be distinguished from the distance r at which the RTF is measured. f(r') is expressed by Expression (3).

$$f(r') = \alpha_1/r' + \alpha_2 \quad (3)$$

In Expression (3), $\alpha_1$ and $\alpha_2$ are a coefficient indicating a contribution of a component inversely proportional to the distance r' and a coefficient indicating a contribution of a constant component not dependent on the distance r', respectively. The contribution of the component inversely proportional to the distance r' means a contribution of a direct sound.

Expressions (2) and (3) are based on assumptions (i) and (ii) including (i) an assumption that the phase of the RTF does not vary depending on the position of a sound source in the room Rm and (ii) an assumption that the amplitude of the RTF includes a component decreasing in inverse proportion to the distance r'.

Specifically, the reverberation characteristic combination unit 101 determines the coefficients $\alpha_1$ and $\alpha_2$ in advance by performing the following process.

Figure 3:
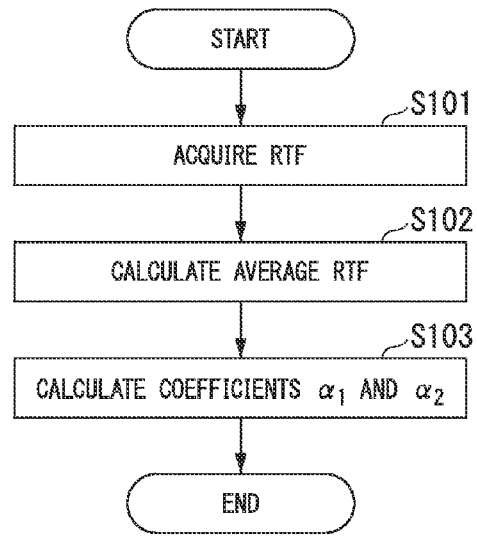
FIG. 3 is a flowchart illustrating an example of a coefficient calculating process.

FIG. 3 is a flowchart illustrating an example of a coefficient calculating process.

(Step S101) The reverberation characteristic combination unit 101 measures $i_d$ (where $i_d$ is an integer greater than 1, for example, 3) RTFs A(ω, $r_i$) in advance. The distance $r_i$ (where i is an integer of 1 to $i_d$) is a distance different from each other.

For example, when the sound collection unit 12 includes multiple microphones and a sound based on an existing output sound signal is reproduced, the reverberation characteristic combination unit 101 can acquire the RTFs $A(\omega, r_i)$ using the sound signals recorded by the microphones. Thereafter, the process proceeds to step S102.

(Step S102) The reverberation characteristic combination unit 101 calculates an average RTF $\langle A(r_i) \rangle$ by averaging the acquired RTFs $A(\omega, r_i)$ in a frequency section. The reverberation characteristic combination unit 101 uses, for example, Expression (4) to calculate the average RTF $\langle A(r_i) \rangle$.

$$\langle A(r_i) \rangle = \frac{1}{p_h - p_l + 1} \sum_{p=p_l}^{p_h} |A(\omega_p, r_i)| \quad (4)$$

In Expression (4), | . . . | is the absolute value of . . . , p is an index (frequency bin) indicating each frequency, and $p_h$ and $p_l$ are indices indicating the highest frequency and the lowest frequency in the frequency section in which the averaging is performed.

Thereafter, the process proceeds to step S103.

(Step S103) The reverberation characteristic combination unit 101 calculates the coefficients $\alpha_1$ and $\alpha_2$ so that the average RTF $\langle A(r_i) \rangle$ is suitable for the acoustic model expressed by Expressions (2) and (3). The reverberation characteristic combination unit 101 uses, for example, Expression (5) to calculate the coefficients $\alpha_1$ and $\alpha_2$.

$$[\alpha_1, \alpha_2]^T = ([F_y]^T[F_y])^{-1}[F_y]^T[F_x] \quad (5)$$

In Expression (5), [ . . . ] represents a vector or a matrix and T represents the transpose of a vector or a matrix. As expressed by Expression (6), $[F_x]$ is a matrix having a vector including a reciprocal $1/r_i$ of the distance and 1 as each column. $[F_y]$ is a vector having the average RTF $\langle A(r_i) \rangle$ as each column.

$$[F_x] = \begin{bmatrix} 1/r_1 & 1 \\ \vdots & \vdots \\ 1/r_{i_d} & 1 \end{bmatrix} \quad [F_y] = \begin{bmatrix} \langle A(r_1) \rangle \\ \vdots \\ \langle A(r_{i_d}) \rangle \end{bmatrix} \quad (6)$$

Thereafter, the process flow illustrated in FIG. 3 ends.

The reverberation characteristic combination unit 101 calculates a gain $f_{k\Delta}(r')$ of the reverberation characteristic $A'_{[r]}{}^{k\Delta}(\omega, r')$ for each k by substituting the coefficients $\alpha_1$ and $\alpha_2$ calculated by Expressions (5) and (6) into Expression (3) as illustrated in Expression (7).

$$f_{k\Delta}(r') = k \cdot \Delta \cdot \alpha_1 / r' + \alpha_2 \quad (7)$$

In Expression (7), the component inversely proportional to the distance r' is $k \cdot \Delta$ times the same component in Expression (3).

The reverberation characteristic combination unit 101 calculates the reverberation characteristic $A'_{[r]}{}^{k\Delta}(\omega, r')$ for each k using Expression (8) based on the calculated gain $f_{k\Delta}(r')$ and the RTF $A(\omega, r)$.

$$A'_{[r]}{}^{k\Delta} = f_{k\Delta}(r') A(\omega, r) \quad (8)$$

In Expression (8), f(r') of Expression (3) is substituted with $f_{k\Delta}(r')$. That is, by changing the gain $f_{k\Delta}(r')$ for each k using Expression (7), the contribution of the component inversely proportional to the distance r' can be changed and can be multiplexed into K reverberation characteristics $A'_{[r]}{}^{k\Delta}(\omega, r')$.

Accordingly, it is possible to artificially combine different reverberation characteristics $A'_{[r]}{}^{k\Delta}(\omega, r')$ corresponding to K distances r'.

Acoustic Model

For example, the GMM will be first described as an acoustic model $\pi^{(c)}$ treated by the acoustic model adaptation unit 104. The GMM is a kind of acoustic model in which the output probabilities for input sound feature amounts are weighted and added with multiple (for example, 256) normal distributions as a basis. Accordingly, the acoustic model $\pi^{(c)}$ is defined by statistics such as mixture weighting coefficients, mean values, and a covariance matrix. The mixtures of normal distributions used to calculate the output probabilities are classified for each predetermined class.

The acoustic model adaptation unit 104 can determine two types of transform matrices $[W_{mc}{}^{k\Delta}]$ and $[H_{mc}{}^{k\Delta}]$ using the MLLR for each reverberation characteristic $A'_{[r]}{}^{k\Delta}(\omega, r')$. Here, c represents a class and $m_c$ represents a combination of normal distributions at class c. [ . . . ] is a sign indicating that . . . is a matrix or a vector. These transform matrices are matrices for transforming the acoustic model $\pi^{(c)}$ to the adaptive acoustic model $\pi_{[r]}{}^{k\Delta}$ corresponding to the reverberation characteristic $A'_{[r]}{}^{k\Delta}(\omega, r')$. The transform matrices $[W_{mc}{}^{k\Delta}]$ and $[H_{mc}{}^{k\Delta}]$ have relationships expressed by Expressions (9) and (10), respectively.

$$[\mu_{mc}{}^{k\Delta}] = [W_{mc}{}^{k\Delta}][\zeta_{mc}] \quad (9)$$

$$[\Sigma_{mc}{}^{k\Delta}] = [B_{mc}]^T[H_{mc}{}^{k\Delta}][B_{mc}] \quad (10)$$

In Expression (9), $[\mu_{mc}{}^{k\Delta}]$ represents a mean vector. The mean vector $[\mu_{mc}{}^{k\Delta}]$ is a vector having the average value of normal distributions constituting the adaptive acoustic model $\pi_{[r]}{}^{k\Delta}$ as an element. $[\zeta_{mc}]$ is an extended mean vector. The extended mean vector $[\zeta_{mc}]$ is a vector in which an bias offset w and a mean vector $[\mu_{mc}{}^{(c)}]$ are coupled, that is, a vector expressed by $[w, [\mu_{mc}{}^{(c)}]^T]^T$. The bias offset value w is 1 or 0 which represents whether a bias offset is used. The mean vector $[\mu_{mc}{}^{(c)}]$ is a vector having the average value of normal distributions constituting the original acoustic model $\pi_{[r]}{}^{(c)}$ as an element.

In Expression (10), $[\Sigma_{mc}{}^{k\Delta}]$ represents a covariance matrix. the covariance matrix $[\Sigma_{mc}{}^{k\Delta}]$ is a vector having a covariance of normal distributions constituting the adaptive acoustic model $\pi_{[r]}{}^{k\Delta}$ as an element. $[B_{mc}]$ is an inverse matrix $[C_{mc}]^{-1}$ of a Choleski factor. The Choleski factor $[C_{mc}]$ has the relationship expressed by Expression (11) with the covariance matrix $[\Sigma_{mc}]$.

$$[\Sigma_{mc}]^{-1} = [C_{mc}][C_{mc}]^T \quad (11)$$

The covariance matrix $[\Sigma_{mc}]$ is a matrix having a covariance matrix of normal distributions constituting the original acoustic model $\pi_{[r]}{}^{(c)}$ as an element.

Accordingly, the acoustic model adaptation unit 104 can transform the original acoustic model $\pi_{[r]}{}^{(c)}$ to the acoustic model $\pi_{[r]}{}^{k\Delta}$ for each reverberation characteristic $A'_{[r]}{}^{k\Delta}(\omega, r')$ using the relationships expressed by Expressions (9) and (10).

Configuration of Correction Data Generation Unit

The configuration of the correction data generation unit 105 according to this embodiment will be described below.

Figure 4:
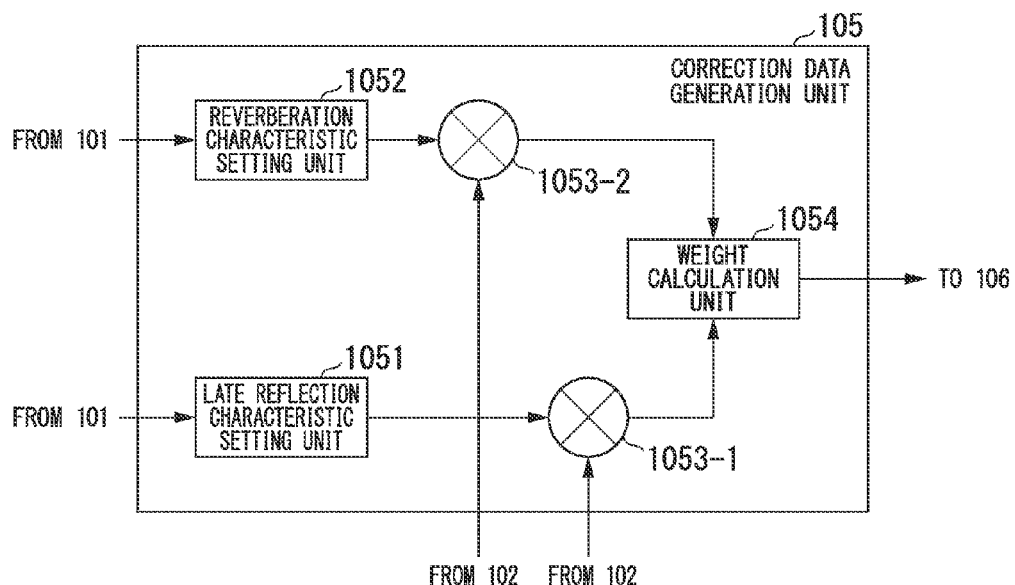
FIG. 4 is a block diagram illustrating a configuration of a correction data generation unit according to the embodiment.

FIG. 4 is a block diagram illustrating the configuration of the correction data generation unit 105 according to this embodiment.

The correction data generation unit 105 includes a late reflection characteristic setting unit 1051, a reverberation characteristic setting unit 1052, two multiplier units 1053-1 and 1053-2, and a weight calculation unit 1054.

The late reflection characteristic setting unit 1051 sets a late reflection transfer function $A'_{L,[r]}{}^{k\Delta}(\omega, r')$, which is the late reflection characteristic corresponding to the RTF $A'_{[r]}{}^{k\Delta}(\omega, r')$ indicated by the reverberation characteristic data input from the reverberation characteristic combination unit 101, as a multiplier coefficient of the multiplier unit 1053-1.

Here, the late reflection characteristic setting unit 1051 calculates an impulse response obtained by transforming the RTF $A'_{[r]}{}^{k\Delta}(\omega, r')$ to the time domain, and extracts components from the calculated impulse response after a predetermined elapsed time (for example, 30 ms). The late reflection characteristic setting unit 1051 transforms the extracted components to the frequency domain and calculates the late reflection transfer function $A'_{L,[r]}{}^{k\Delta}(\omega, r')$.

The reverberation characteristic setting unit 1052 sets the RTF $A'_{[r]}{}^{k\Delta}(\omega, r')$ indicated by the reverberation characteristic data input from the reverberation characteristic combination unit 101 as a multiplier coefficient of the multiplier unit 1053-2.

The multiplier units 1053-1 and 1053-2 multiply the frequency-domain coefficients, which are obtained by transforming the sound signals input from the speech signal acquisition unit 102 to the frequency domain, by the set multiplier coefficients to calculate a frequency-domain coefficient $r_{[r]}{}^{k\Delta}(\omega, r', t)$ of reverbed speech and a late reflection frequency-domain coefficient $l_{[r]}{}^{k\Delta}(\omega, r', t)$. Here, t represents the frame time at that time. The multiplier units 1053-1 and 1053-2 output the calculated frequency-domain coefficient $r_{[r]}{}^{k\Delta}(\omega, r', t)$ of reverbed speech and the calculated late reflection frequency-domain coefficient $l_{[r]}{}^{k\Delta}(\omega, r', t)$ to the weight calculation unit 1054, respectively.

The weight calculation unit 1054 receives a reverbed speech frequency-domain coefficient $r_{[r]}{}^{k\Delta}(\omega, r', t)$ and the late reflection frequency-domain coefficient $l_{[r]}{}^{k\Delta}(\omega, r', t)$ from the multiplier units 1053-1 and 1053-2, respectively. The weight calculation unit 1054 calculates the weighting parameter $\delta_{b,[r]}{}^{k\Delta}$ in which the mean of square error $\Sigma_{b,[r]}{}^{k\Delta}$ of the reverbed speech frequency-domain coefficient $r_{[r]}{}^{k\Delta}(\omega, r', t)$ and the late reflection frequency-domain coefficient $l_{[r]}{}^{k\Delta}(\omega, r', t)$ is the smallest for each frequency band b. The mean square error $\Sigma_{b,[r]}{}^{k\Delta}$ is expressed, for example, by Expression (12).

$$E_{b,[r]} = \frac{1}{T_0} \sum_t \sum_{\omega \in b} |r_{[r]}^{k\Delta}(\omega, r', t) - \delta_{b,[r]}^{k\Delta} l_{[r]}^{k\Delta}(\omega, r', t)|^2 \quad (12)$$

In Expression (12), $T_0$ represents a predetermined time length (for example, 10 seconds) up to that time point. The weight calculation unit 1054 stores the correction data indicating the weight parameter $\delta_{b,[r]}{}^{k\Delta}$ calculated for each frequency band b in the reverberation model storage unit 1061 (FIG. 5) of the reverberation characteristic selection unit 106.

Configuration of Reverberation Characteristic Selection Unit

The configuration of the reverberation characteristic selection unit 106 according to this embodiment will be described below.

Figure 5:
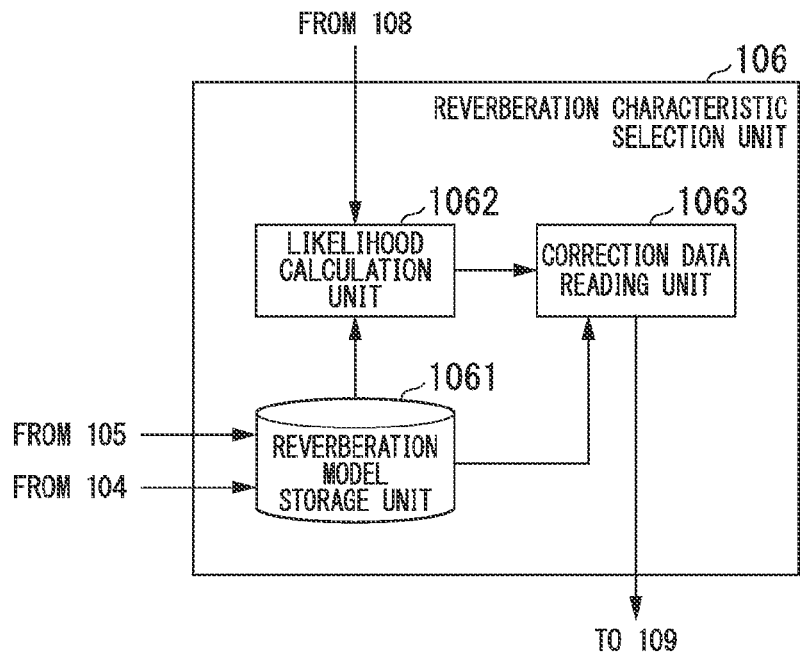
FIG. 5 is a block diagram illustrating a configuration of a reverberation characteristic selection unit according to the embodiment.

FIG. 5 is a block diagram illustrating the configuration of the reverberation characteristic selection unit 106 according to this embodiment.

The reverberation characteristic selection unit 106 includes a reverberation model storage unit 1061, a likelihood calculation unit 1062, and a correction data reading unit 1063.

The reverberation model storage unit 1061 stores the adaptive acoustic model $\pi_{[r]}{}^{k\Delta}$ generated by the acoustic model adaptation unit 104 and the correction data generated by the correction data generation unit 105 in correlation with each other.

The likelihood calculation unit 1062 calculates a likelihood $P(T[u']|\pi_{[r]}{}^{k\Delta})$ of the sound feature amount $T[u']$ indicated by the feature amount data input from the feature amount calculation unit 108 for each acoustic model $\pi_{[r]}{}^{k\Delta}$ stored in the reverberation model storage unit 1061 and outputs the calculated likelihood $P(T[u']|\pi_{[r]}{}^{k\Delta})$ to the correction data reading unit 1063.

The correction data reading unit 1063 selects the acoustic model $\pi_{[r]}{}^{k\Delta}$ corresponding to the maximum likelihood $\max(P(T[u']|\pi_{[r]}{}^{k\Delta}))$ out of the likelihoods $P(T[u']|\pi_{[r]}{}^{k\Delta})$ input from the likelihood calculation unit 1062. The correction data reading unit 1063 reads the correction data correlated with the selected acoustic model $\pi_{[r]}{}^{k\Delta}$ from the reverberation model storage unit 1061 and outputs the read correction data to the dereverberation unit 109.

GHDSS Method

The GHDSS method used in the sound source separation unit 107 will be described below.

The GHDSS method is a method of separating recorded sound signals of multiple channels into sound signals for sound sources. In this method, a separation matrix $[V(\omega)]$ is sequentially calculated, and an input speech vector $[x(\omega)]$ is multiplied by the separation matrix $[V(\omega)]$ to estimate a sound source vector $[u(\omega)]$. The separation matrix $[V(\omega)]$ is a pseudo-inverse matrix of a transfer function matrix $[H(\omega)]$ having transfer functions from the sound sources to the microphones of the sound collection unit 12 as elements. The input speech vector $[x(\omega)]$ is a vector having frequency-domain coefficients of the sound signals of the channels as elements. The sound source vector $[u(\omega)]$ is a vector having the frequency-domain coefficients of the sound signals output from the sound sources as elements.

The GHDSS method is a method of calculating the sound source vector $[u(\omega)]$ so as to minimize two cost functions of a separation sharpness $J_{SS}$ and a geometric constraint $J_{GC}$ at the time of calculating the separation matrix $[V(\omega)]$.

The separation sharpness $J_{SS}$ is an index value indicating a degree to which one sound source is erroneously separated as a different sound source and is expressed, for example, by Expression (13).

$$J_{SS} = \|[u(\omega)][u(\omega)]^* - \text{diag}([u(\omega)][u(\omega)]^*)\|^2 \quad (13)$$

In Expression (13), $\|\ldots\|^2$ represents a Frobenius norm of ..., and * represents the conjugate transpose of a vector or a matrix. diag( ... ) represents a diagonal matrix having diagonal elements of ....

The geometric constraint J is an index value indicating a degree of error of the sound source vector $[u(\omega)]$ and is expressed, for example, by Expression (14).

$$J_{GC} = \|\text{diag}([V(\omega)][A(\omega)] - [I])\|^2 \quad (14)$$

In Expression (14), $[I]$ represents a unit matrix.

Reverberation Model Data Generating Process

The reverberation model data generating process according to this embodiment will be described below. The reverberation model data generating process to be described below is performed in advance before performing a speech processing flow to be described later.

Figure 6:
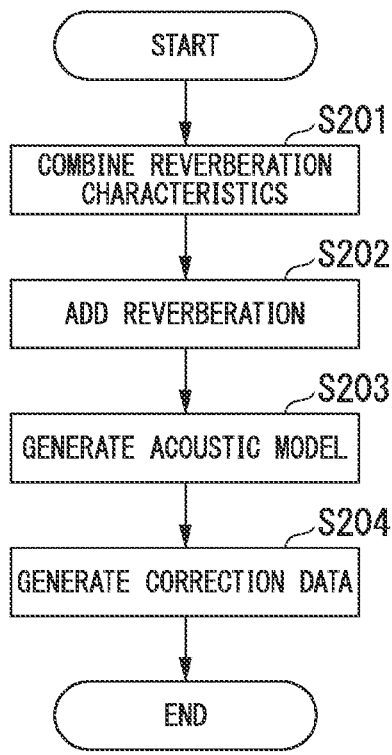
FIG. 6 is a flowchart illustrating a reverberation model data generating process according to the embodiment.

FIG. 6 is a flowchart illustrating the reverberation model data generating process according to this embodiment.

(Step S201) The reverberation characteristic combination unit 101 combine reverberation characteristic data indicating reverberation characteristics $A'_{[r]}{}^{k\Delta}(\omega, r')$ corresponding to a target distance r' based on a predetermined reverberation model. The reverberation characteristic combination unit 101 outputs the combined reverberation characteristic data to the reverberation unit 103 and the correction data generation unit 105. Thereafter, the process proceeds to step S202.

(Step S202) The reverberation unit 103 transforms speech signals in the time domain input from the speech signal acquisition unit 102 to frequency-domain coefficients in the frequency domain, and multiplies the transformed frequency-domain coefficients by the reverberation characteristics $A'_{[r]}{}^{k\Delta}(\omega, r')$ indicated by the reverberation characteristic data input from the reverberation characteristic combination unit 101 to calculate the frequency-domain coefficients $s_{[r]}{}^{k\Delta}(\omega, r')$ of reverbed speech. The reverbed frequency-domain coefficient data indicating the calculated frequency-domain coefficients $s_{[r]}{}^{k\Delta}(\omega, r')$ is output to the acoustic model adaptation unit 104. Thereafter, the process proceeds to step S204.

(Step S203) The acoustic model adaptation unit 104 generates an adaptive acoustic model $\pi_{[r]}{}^{k\Delta}$ having the highest likelihood in the previously-stored acoustic models $\pi^{(c)}$ using the transform coefficients $s_{[r]}{}^{k\Delta}(\omega, r')$ indicated by the reverbed frequency-domain coefficient data input from the reverberation unit 103. The acoustic model adaptation unit 104 stores the generated adaptive acoustic model $\pi_{[r]}{}^{k\Delta}$ in the reverberation model storage unit 1061. Thereafter, the process proceeds to step S203.

(Step S204) The correction data generation unit 105 calculates the weighting parameters $\delta_{b,[r]}{}^{k\Delta}$ of the sound sources for each predetermined frequency band b based on the reverberation characteristic data input from the reverberation characteristic combination unit 101. Here, the weighting parameters $\delta_{b,[r]}{}^{k\Delta}$ are calculated so as to minimize the difference between the power of the late reflection corrected using the weighting parameters $\delta_{b,[r]}{}^{k\Delta}$ and the power of the reverbed speech. The correction data generation unit 105 stores the correction data indicating the calculated weighting parameters $\delta_{b,[r]}{}^{k\Delta}$ in the reverberation model storage unit 1061 in correlation with the adaptive acoustic model $\pi_{[r]}{}^{k\Delta}$. Thereafter, the process flow illustrated in FIG. 6 ends.

Speech Processing Flow

A speech processing flow according to this embodiment will be described below.

Figure 7:
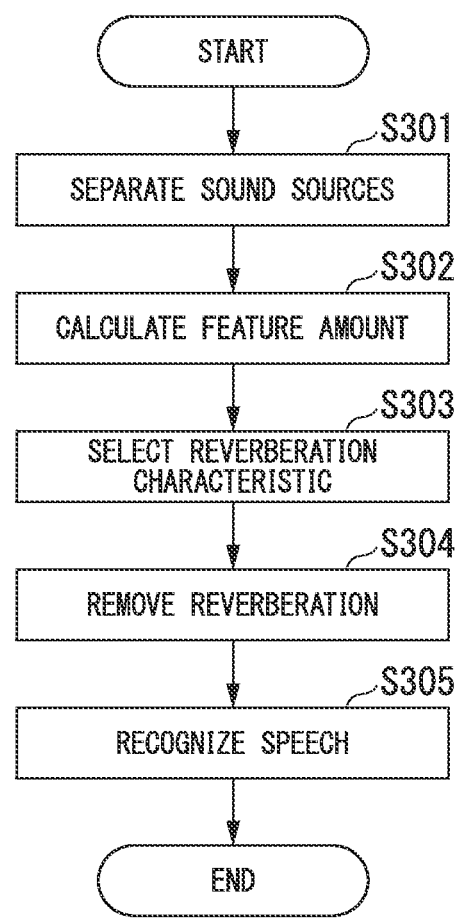
FIG. 7 is a flowchart illustrating a speech processing flow according to the embodiment.

FIG. 7 is a flowchart illustrating the speech processing flow according to this embodiment.

(Step S301) The sound source separation unit 107 performs a sound source separating process on the sound signals of N channels input from the sound collection unit 12 and separates the sound signals into sound signals for one or more sound sources. The sound source separation unit 107 outputs the separated sound signals for the sound sources to the feature amount calculation unit 108 and the dereverberation unit 109. Thereafter, the process proceeds to step S302.

(Step S302) The feature amount calculation unit 108 calculates the sound feature amounts T(u') of the sound signals input from the sound source separation unit 107 for each predetermined time interval and outputs feature amount data indicating the calculated sound feature amounts T(u') to the reverberation characteristic selection unit 106. Thereafter, the process proceeds to step S303.

(Step S303) The reverberation characteristic selection unit 106 calculates the likelihoods $P(T[u']|\pi_{[r]}{}^{k\Delta})$ based on the acoustic models $\pi_{[r]}{}^{k\Delta}$ stored in the reverberation model storage unit 1061 for the sound feature amounts T(u') indicated by the feature amount data input from the feature amount calculation unit 108. The reverberation characteristic selection unit 106 selects the acoustic model $\pi_{[r]}{}^{k\Delta}$ in which the calculated likelihood $P(T[u']|\pi_{[r]}{}^{k\Delta})$ is the maximum and reads the correction data corresponding to the selected acoustic model $\pi_{[r]}{}^{k\Delta}$ from the reverberation model storage unit 1061. The read correction data is output to the dereverberation unit 109. Thereafter, the process proceeds to step S304.

(Step S304) The dereverberation unit 109 separates the sound signals input from the sound source separation unit 107 into components for the frequency bands b and corrects the amplitude of the separated frequency band components using the weighting parameters $\delta_{b,[r]}{}^{k\Delta}$ indicated by the correction data input from the reverberation characteristic selection unit 106. The dereverberation unit 109 generates dereverbed speech signals indicating the dereverbed speech by combining the band components of which the amplitude is corrected over the frequency bands b and outputs the generated dereverbed speech signals to the speech recognition unit 110.

Thereafter, the process proceeds to step S305.

(Step S305) The speech recognition unit 110 performs a speech recognizing process on the dereverbed speech signals input from the dereverberation unit 109, recognizes speech details thereof, and outputs recognition data indicating the recognized speech details to the outside. Thereafter, the process flow illustrated in FIG. 7 ends.

Measurement Example of RTF

A measurement example of the RTF will be described below.

Figure 8:
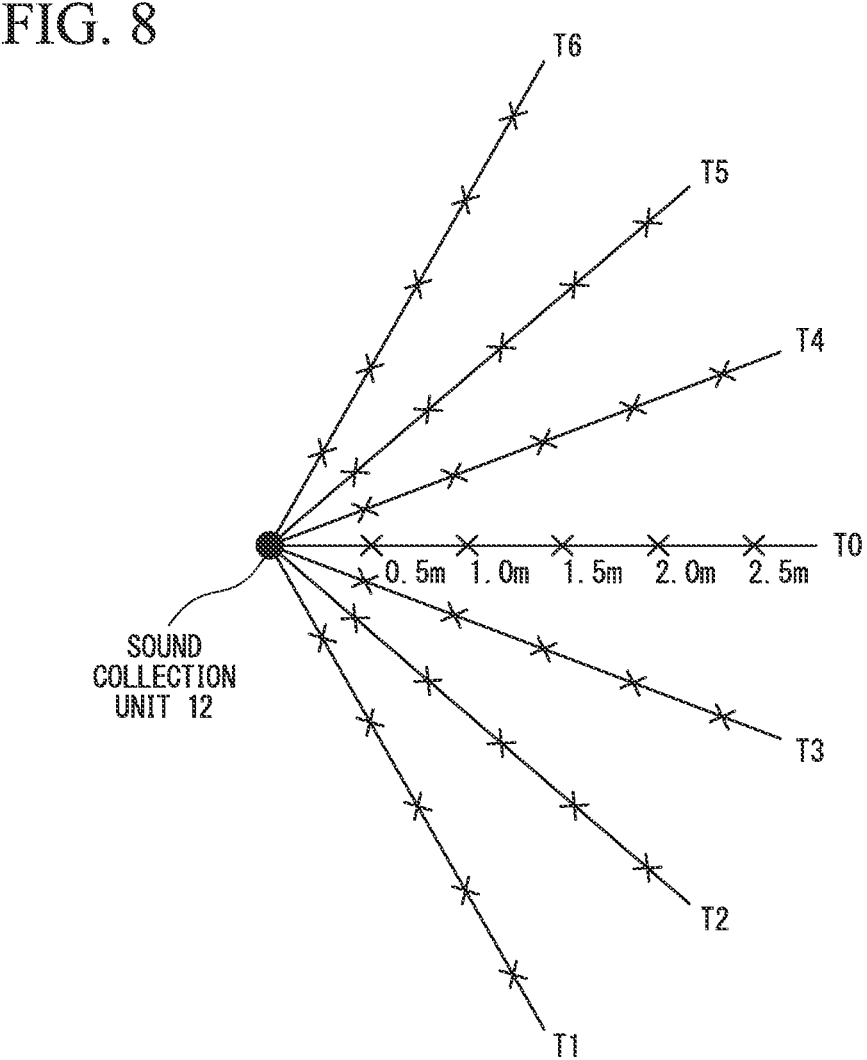
FIG. 8 is a plan view illustrating an example of an RTF measurement environment.

FIG. 8 is a plan view illustrating an example of an RTF measurement environment.

An RTF can be obtained by causing sound sources to issue sounds based on existing sound signals and using sound signals recorded by the sound collection unit 12. In FIG. 8, the center of the sound collection unit 12 is marked by a black circle and positions of sound sources are marked as x marks in a line segment T0 extending to the right side from the sound collection unit 12. Here, the distances r are 0.5 m, 1.0 m, 1.5 m, 2.0 m, and 2.5 m.

Measurement was carried out in two test rooms Rm1 and Rm2 having different reverberation characteristics and the reverberation times $T_{60}$ of the test rooms Rm1 and Rm2 were 240 ms and 640 ms, respectively. The reverberation time $T_{60}$ is an elapsed time until the RTF decreases from the maximum value to −60 dB. In each test room, the RTFs at the measurement positions indicated by x marks in line segments T1 to T6 extending from the sound collection unit 12 are measured. The directions of the line segments T1, T2, and T3 are 20°, 40°, and 60° in the clockwise direction from the line segment T0. The directions of the line segments T4, T5, and T6 are 20°, 40°, and 60° in the counterclockwise direction from the line segment T0.

Figure 9:
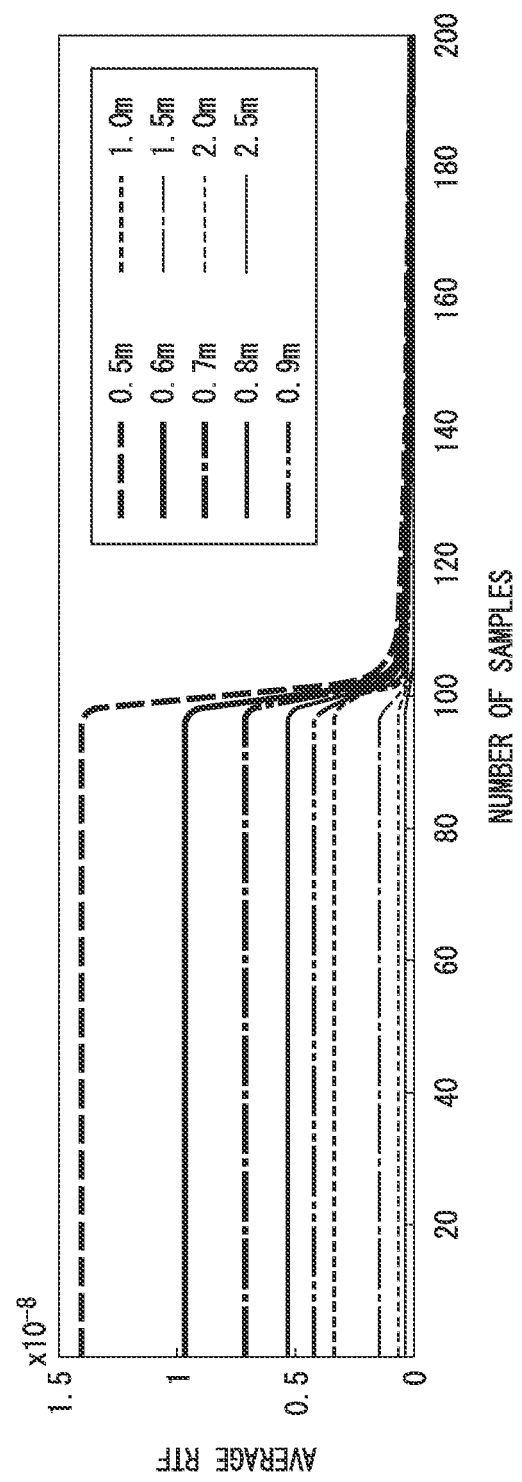
FIG. 9 is a diagram illustrating an example of an average RTF.

FIG. 9 is a diagram illustrating an example of an average RTF.

The horizontal axis represents the number of samples and the vertical axis represents the average RTF. In this example, one sample corresponds to one frame. In FIG. 9, the average RTFs when the distance r is 0.5 m, 0.6 m, 0.7 m, 0.9 m, 1.0 m, 1.5 m, 2.0 m, and 2.5 m are expressed by curves. The average RTFs decrease with an increase in the distance r. For example, when the distance r is 0.5 m, 1.0 m, and 2.0 m, the average RTFs are $1.4 \times 10^{-8}$, $0.33 \times 10^{-8}$, and $0.08 \times 10^{-8}$, respectively, and decrease with an increase in the distance r. The average RTFs of the samples subsequent to the 100-th sample decrease to almost 0 regardless of the distance r.

This point supports that the phase does not depend on the distance r, that is, supports the above-mentioned assumption (i).

Figure 10:
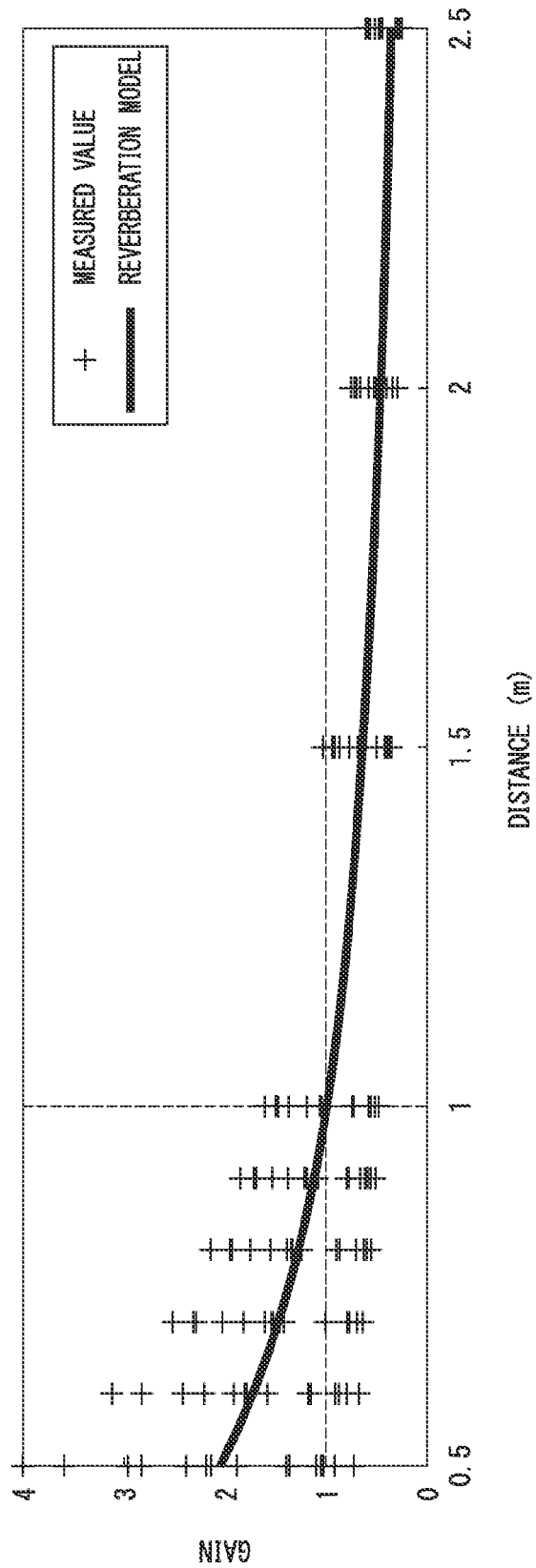
FIG. 10 is a diagram illustrating an example of an RTF gain.

FIG. 10 is a diagram illustrating an example of a gain of the RTF.

The horizontal axis represents the distance and the vertical axis represents the gain. In this example, the measured value of the gain of the RTF is indicated by marks + and the estimated value based on the above-mentioned acoustic model is indicated by a solid line. The measured values are distributed around the estimated values and have a tendency that the variance increases with a decrease in the distance r. However, the maximum value and the minimum value of the measured values at the distances r are almost inversely proportional to the distance r. For example, the maximum value of the measured values is 3.6, 1.7, and 0.8 for the distances of 0.5 m, 1.0 m, and 2.0 m, respectively. Therefore, the measured values can approach the estimated values by adjusting the coefficients $\alpha_1$ and $\alpha_2$. This point supports the above-mentioned assumption (ii).

Test Result

A test result in which the speech recognition accuracy is verified using the speech processing device 11 according to this embodiment will be described below.

The test was carried out in the two test rooms Rm1 and Rm2. In each test room, the number of samples of speech was 200 times for each measurement position at which the RTF was measured and the number of words to be recognized was 20,000 words. The speech recognition unit 110 used a phonetically tied mixture (PTM) HMM including total 8256 normal distributions, which is a kind of continuous HMM, as acoustic models. At the time of training the acoustic models, a Japanese newspaper article sentence (JNAS) corpus was used as a training database for clean speech. The language model used by the speech recognition unit 110 was a standard word trigram model.

In the test, speech was processed using the following six methods, the processed speech was subjected to the speech recognition, and the word recognition rates thereof were observed.

Method A. Speech is unprocessed.

Method B. Existing blind dereverberation is performed.

Method C. Existing spectral subtraction is performed.

Method D. The late reflection component is removed by the dereverberation unit 109 (this embodiment).

Method E. The late reflection component is removed by the dereverberation unit 109 and the correction data selected by the acoustic model adaptation unit 104 is used (this embodiment).

Method F. Reverberations are removed using measured RTFs.

Example of Word Recognition Rate

FIGS. 11 and 12 are diagrams illustrating an example of a word recognition rate for each processing method.

FIGS. 11 and 12 illustrate the word recognition rates (% in unit) obtained in the test rooms Rm1 and Rm2, respectively. The rows represent the methods (Methods A to F) of processing uttered speech and the columns represent the distances r'.

Out of the test rooms Rm1 and Rm2, the test room Rm2 having a longer reverberation time has a lower word recognition rate. In the same test room, the larger the distance becomes, the lower the word recognition rate becomes. The word recognition rate increases in the order of Methods A, B, C, D, E, and F (the word recognition rate is the largest in Method F). For example, when the distance r' in the test room Rm1 is 2.5 m, 50.8% in Method D according to this embodiment is significantly higher than 46.1% in Method C according to related art. This result shows that the speech recognition rate is improved more than that in the related art by the dereverbing based on the above-mentioned reverberation models.

55.4% in Method E according to this embodiment is significantly higher than 50.8% in Method D and is almost equal to 56.1% in Method F. Accordingly, it is possible to obtain a high speech recognition rate equivalent to that when the reverberation characteristics are satisfactorily removed without measuring the reverberation characteristics, by the dereverbing using the correction data selected based on the above-mentioned acoustic models.

As described above, the speech processing device according to this embodiment (for example, the speech processing device 11) includes the reverberation characteristic selection unit (for example, the reverberation characteristic selection unit 106) configured to correlate the correction data indicating the contribution of the reverbed component based on the corresponding reverberation characteristic and the adaptive acoustic model trained using the reverbed speech to which the reverberation based on the corresponding reverberation characteristic is added for each of the reverberation characteristics, to calculate the likelihoods of the recorded speech based on the adaptive acoustic models, and to select the correction data corresponding to the adaptive acoustic model of which the calculated likelihood is the highest and the dereverberation unit (for example, the dereverberation unit 109) configured to remove the reverbed component from the speech based on the selected correction data.

Accordingly, in the speech processing device according to this embodiment, the correction data of the reverberation characteristic based on the adaptive acoustic model having the highest likelihood is selected for the recorded speech and the reverbed component indicated by the correction data is removed from the speech. As a result, it is possible to realize reverberation reduction capable of improving the speech recognition accuracy without measuring the reverberation characteristics.

In the speech processing device according to this embodiment, the contributions of the components inversely proportional to the distance between the sound collection unit recording speech from a sound source and the sound source are different in the reverberation characteristics. Accordingly, since the contributions of direct sounds emitted from the different sound sources can be considered depending on the distances from the sound collection unit to the sound sources at the time of combining the reverberation characteristics, it is possible to improve the reverberation reduction accuracy.

Modification Example

A modification example of this embodiment will be described below. The same elements as in the above-mentioned embodiment will be referenced by the same reference signs and the description thereof will be employed.

Figure 13:
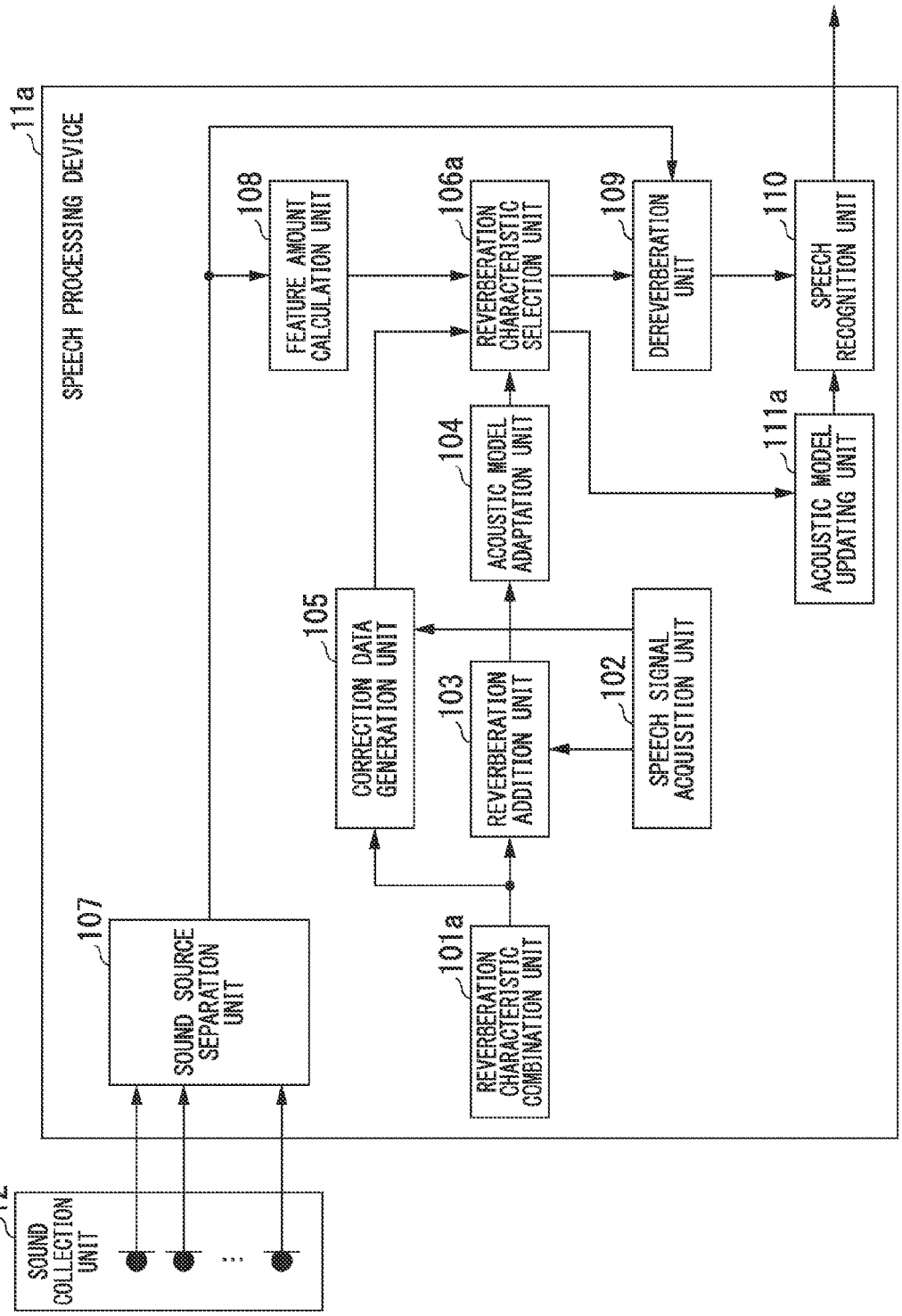
FIG. 13 is a block diagram illustrating a configuration of a speech processing device according to a modification example of the embodiment.

FIG. 13 is a block diagram illustrating the configuration of a speech processing device 11a according to this modification example.

The speech processing device 11a includes a reverberation characteristic combination unit 101a, a speech signal acquisition unit 102, a reverberation unit 103, an acoustic model adaptation unit 104, a correction data generation unit 105, a reverberation characteristic selection unit 106a, a sound source separation unit 107, a feature amount calculation unit 108, a dereverberation unit 109, a speech recognition unit 110, and an acoustic model updating unit (acoustic model prediction unit) 111a.

That is, the speech processing device 11a includes the reverberation characteristic combination unit 101a and the reverberation characteristic selection unit 106a instead of the reverberation characteristic combination unit 101 and the reverberation characteristic selection unit 106 in the speech processing device 11 (FIG. 2). The speech processing device 11a further includes the acoustic model updating unit 111a.

The reverberation characteristic combination unit 101a combines the reverberation characteristic data indicating the reverberation characteristics $A'_{[r]}(\omega, r_k')$ corresponding to the different distances $r_k'$ based on the above-mentioned acoustic models.

Specifically, the reverberation characteristic combination unit 101a calculates the gains $f(r_k')$ of the reverberation characteristics $A'_{[r]}(\omega, r_k')$ as expressed by Expression (15) by performing the above-mentioned coefficient calculating process (FIG. 3) to determine coefficients $\alpha_1$ and $\alpha_2$ and substituting the determined coefficients $\alpha_1$ and $\alpha_2$ into Expression (3).

$$f(r_k')=\alpha_1/r_k'+\alpha_2 \qquad (15)$$

The reverberation characteristic combination unit 101a calculates the reverberation characteristics $A'_{[r]}(\omega, r_k')$ by multiplying the calculated gains $f(r_k')$ by previously-acquired RTFs $A(\omega, r)$ as expressed by Expression (16).

$$A'_{[r]}(\omega,r_k')=f(r_k')A(\omega,r) \qquad (16)$$

The first term $\alpha_1/r_k'$ in Expression (15) is substituted for $k \cdot A \cdot \alpha_1/r'$ in Expression (7). That is, the first term of Expression (15) is explicitly described as a function of the distance $r_k'$. This is suitable for performing a process explicitly using the distance $r_k'$ to be described.

The reverberation characteristic combination unit 101a outputs the combined reverberation characteristic data to the reverberation unit 103 and the correction data generation unit 105. The reverberation unit 103, the acoustic model adaptation unit 104, and the correction data generation unit 105 use the reverberation characteristics $A'_{[r]}{}^{k\Delta}(\omega, r_k')$ in the above-mentioned processes. Here, reverberation characteristic data indicating the reverberation characteristics $A'_{[r]}(\omega, r_k')$ is used instead of the reverberation characteristic data.

Therefore, the reverberation characteristic selection unit 106a receives the adaptive acoustic models $\pi_{[r]}{}^k$ generated by the acoustic model adaptation unit 104 and the correction data generated by the correction data generation unit 105. The adaptive acoustic models $\pi_{[r]}{}^k$ are acoustic models trained so as to maximize the likelihood using the reverbed frequency-domain coefficient data based on the reverberation characteristics $A'_{[r]}(\omega, r_k')$. The correction data is data indicating the weighting parameters $\delta_{b,[i]}{}^k$, which are determined so as to minimize the difference between the power of the late reflection and the power of the reverbed speech, of the reverberation characteristics $A'_{[r]}(\omega, r_k')$.

The reverberation characteristic selection unit 106a includes a reverberation model storage unit 1061a (not illustrated), a likelihood calculation unit 1062 (FIG. 5), and a correction data reading unit 1063a (not illustrated).

The reverberation model storage unit 1061a stores the adaptive acoustic models $\pi_{[r]}{}^k$ generated by the acoustic model adaptation unit 104, the correction data generated by the correction data generation unit 105, and the distance data indicating the distances r' in correlation with each other.

Therefore, the likelihood calculation unit 1062 calculates the likelihoods $P(T[u']|\pi_{[r]}{}^k)$ of the acoustic models $\pi_{[r]}{}^k$ stored in the reverberation model storage unit 1061a and outputs the calculated likelihood $P(T[u']|\pi_{[r]}{}^k)$ to the correction data reading unit 1063a.

The correction data reading unit 1063a selects the acoustic models $\pi_{[r]}{}^k$ having the highest likelihood $\max(P(T[u']|\pi_{[r]}{}^k))$ out of the likelihoods $P(T[u']|\pi_{[r]}{}^k)$ input from the likelihood calculation unit 1062. The correction data reading unit 1063a reads the correction data and the distance data correlated with the selected acoustic model $\pi_{[r]}{}^{k\Delta}$ from the reverberation model storage unit 1061a. The correction data reading unit 1063a outputs the read correction data to the dereverberation unit 109 and outputs the read distance data to the acoustic model updating unit 111a. In the following description, the distance indicated by the read distance data is defined as r'. Accordingly, it is possible to detect the distance r' without including hardware for detection.

The acoustic model updating unit 111a includes a storage unit in which the acoustic models $\lambda^{(c)}$ generated by training using clean speech (that is, the distances r) and the acoustic models $\lambda^{(r)}$ generated by training so as to maximize the likelihood using speech uttered at predetermined distances r are stored in advance. The acoustic models $\lambda^{(c)}$ and $\lambda^{(r)}$ are acoustic models $\pi_{[r]}{}^{(c)}$ based on the clean speech and are different from the adaptive acoustic models $\pi_{[r]}{}^k$. In order to distinguish these acoustic models, the acoustic models $\lambda^{(c)}$ and $\lambda^{(r)}$ are referred to as recognition models $\lambda^{(c)}$ and $\lambda^{(r)}$.

The acoustic model updating unit 111a generates a recognition model $\lambda'$ by prediction based on the distance r' indicated by the distance data input from the reverberation characteristic selection unit 106a using the two stored recognition models $\lambda^{(c)}$ and $\lambda^{(r)}$. Here, the symbol (c) and (r) represent the clean speech and the reverbed speech uttered at the distance r. The prediction is a concept including both interpolation and extrapolation.

The acoustic model updating unit 111a outputs the generated recognition model $\lambda'$ to the speech recognition unit 110 and updates the recognition model used by the speech recognition unit 110 to the recognition model $\lambda'$. Accordingly, the speech recognition unit 110 performs the speech recognizing process using the acoustic model $\lambda'$ generated by the acoustic model updating unit 111a. Here, the recognition models $\lambda^{(c)}$ and $\lambda^{(r)}$ may be referred to as a clean acoustic model $\lambda^{(c)}$ and a reverbed acoustic model $\lambda^{(r)}$, respectively, for distinction.

Process of Predicting Recognition Model

The process of predicting a recognition model will be described below.

The recognition models $\lambda^{(c)}$ and $\lambda^{(r)}$ are used to recognize phonemes based on the sound feature amounts. The recognition models $\lambda^{(c)}$ and $\lambda^{(r)}$ are, for example, continuous hidden Markov models (continuous HMMs). The continuous HMM is a model in which an output distribution density is a continuous function, and the output distribution density is weighted and added with multiple normal distributions as a basis. For example, the reverbed acoustic model $\lambda^{(r)}$ is defined by statistics such as a mixture weight $[C_{im}{}^{(r)}]$ for each normal distribution, a mean value $[\mu_{im}{}^{(r)}]$, a covariance matrix $[\Sigma_{im}{}^{(r)}]$, and a transition probability $a_{ij}{}^{(r)}$. Here, i and j are indices indicating a current state and a transition destination state, respectively, and m is an index indicating the frequency band. The clean acoustic model $\lambda^{(c)}$ is also defined by the same types of statistics $[C_{im}{}^{(c)}]$, $[\mu_{im}{}^{(c)}]$, $[\Sigma_{im}{}^{(c)}]$, and $a_{ij}{}^{(c)}$ as the reverbed acoustic model $\lambda^{(r)}$.

The mixture weight $[C_{im}{}^{(r)}]$, the mean value $[\mu_{im}{}^{(r)}]$, the covariance matrix $[\Sigma_{im}{}^{(r)}]$, and the transition probability $a_{ij}{}^{(r)}$ are expressed by sufficient statistics such as a probability of accumulated mixture component occupancy $L_{im}{}^{(r)}$, a probability of state occupancy $L_{ij}{}^{(r)}$, a mean $[m_{ij}{}^{(r)}]$, and a variance $[v_{ij}{}^{(r)}]$ and have relationships expressed by Expressions (17) to (20).

$$C_{im}{}^{(r)}=L_{im}{}^{(r)}/\Sigma_{m=1}{}^M L_{im}{}^{(r)} \qquad (17)$$

$$[\mu_{im}{}^{(r)}]=[m_{ij}{}^{(r)}]/L_{im}{}^{(r)} \qquad (18)$$

$$[\Sigma_{im}{}^{(r)}]=[v_{ij}{}^{(r)}]/L_{im}{}^{(r)}-[\mu_{im}{}^{(r)}]^T \qquad (19)$$

$$a_{ij}{}^{(r)}=L_{ij}{}^{(r)}/\Sigma_{j=1}{}^J L_{ij}{}^{(r)} \qquad (20)$$

In Expression (20), i and j are indices indicating a current state and a transition destination state, respectively, and J represents the number of transition destination states. In the following description, the probability of accumulated mixture component occupancy $L_{im}^{(r)}$, the probability of state occupancy $L_{im}^{(r)}$, the mean $[m_{ij}^{(r)}]$, and the variance $[v_{ij}^{(r)}]$ are collectively referred to as priors $\beta^{(r)}$.

The acoustic model updating unit 111a generates an acoustic model $\lambda'$ by performing linear prediction (interpolation or extrapolation) with coefficients $\tau(d')$ corresponding to the distances d' with the acoustic model $\lambda^{(r)}$ as a basis using the acoustic models $\lambda^{(r)}$ and $\lambda^{(c)}$. The acoustic model updating unit 111a uses, for example, Expressions (21) to (24) to generate the acoustic model $\lambda'$.

$$C'_{im} = \frac{L_{im}^{(r)} + \tau(r')L_{im}^{(c)}}{\sum_{m=1}^{M} L_{im}^{(r)} + \tau(r')L_{im}^{(c)}} \quad (21)$$

$$[\mu'_{im}] = \frac{[m_{im}^{(r)}] + \tau(r')[m_{im}^{(c)}]}{\sum_{m=1}^{M} L_{im}^{(r)} + \tau(r')L_{im}^{(c)}} \quad (22)$$

$$[\Sigma'_{im}] = \frac{[v_{im}^{(r)}] + \tau(r')[m_{im}^{(c)}]}{L_{im}^{(r)} + \tau(r')L_{im}^{(c)}} - [\mu_{im}^{(r)}][\mu_{im}^{(r)}]^T \quad (23)$$

$$a'_{ij} = \frac{L_{ij}^{(r)} + \tau(r')L_{ij}^{(c)}}{\sum_{j=1}^{J} L_{ij}^{(r)} + \tau(r')L_{ij}^{(c)}} \quad (24)$$

In Expressions (21) to (24), $L_{im}^{(c)}$, $L_{ij}^{(c)}$, $[m_{ij}^{(c)}]$, and $[v_{ij}^{(c)}]$ respectively represent the probability of accumulated mixture component occupancy, the probability of state occupancy, the mean, and the variance in the clean acoustic model $\lambda^{(c)}$ and are collectively referred to as priors $\beta^{(c)}$. The coefficient $\tau(r')$ is a function of which the value is 0 when r'=0 and the coefficient $\tau(r')$ decreases with an increase in r'. As r' approaches 0, the coefficient $\tau(r')$ approaches the infinity.

The priors $\beta^{(c)}$ increase with an increase in the power level and thus vary depending on the distance r'. As expressed by Expressions (21) to (24), an acoustic model $\lambda'$ is predicted with high accuracy by performing the linear prediction based on such statistics. Accordingly, the speech recognition unit 110 performs the speech recognizing process using the predicted acoustic model $\lambda'$, whereby the recognition rate is improved.

A speech processing flow according to this modification example will be described below.

Figure 14:
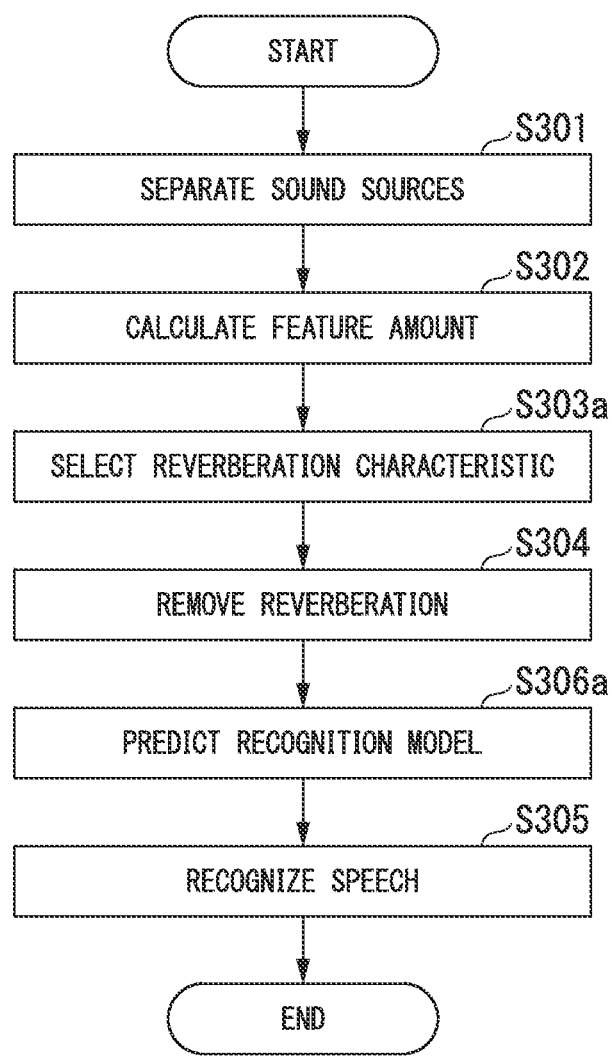
FIG. 14 is a flowchart illustrating a speech processing flow according to the modification example.

FIG. 14 is a flowchart illustrating a speech processing flow according to this modification example.

The speech processing flow illustrated in FIG. 14 includes steps S301, S302, S303a, S304, S305, and S306a. This speech processing flow includes step S303a instead of S303 in the speech processing flow illustrated in FIG. 7 and further includes step S306a.

In this speech processing flow, after the processes of steps S301 and S302 are performed, the process proceeds to step S303a.

(Step S303a) The reverberation characteristic selection unit 106a calculates the likelihood $P(T[u']|\pi_{[r]}^k)$ of the sound feature amount $T[u']$ indicated by the feature amount data input from the feature amount calculation unit 108 for each acoustic model $\pi_{[r]}^k$ stored in advance. The reverberation characteristic selection unit 106a specifies the correction data and the distance data correlated with the acoustic model $\pi_{[r]}^k$ corresponding to the likelihood $\max(P(T[u']|\pi_{[r]}^k))$ in which the calculated likelihood $P(T[u']|\pi_{[r]}^k)$ is the highest. The reverberation characteristic selection unit 106a outputs the specified correction data to the dereverberation unit 109 and outputs the specified distance data to the acoustic model updating unit 111a. Thereafter, the process proceeds to step S304. After the process of step S304 is performed, the process proceeds to step S306a.

(Step S306a) The acoustic model updating unit 111a generates the recognition model $\lambda'$ by prediction based on the distance r' indicated by the distance data input from the reverberation characteristic selection unit 106a using two recognition models $\lambda^{(c)}$ and $\lambda^{(r)}$. The acoustic model updating unit 111a sets the generated recognition model $\lambda'$ in the speech recognition unit 110. Thereafter, the process of step S305 is performed and the process flow illustrated in FIG. 14 ends.

The speech processing device 11a is not limited to the acoustic model updating unit 111a but may include a configuration for performing a process based on the distance r'. The configuration for performing a process based on the distance r' is, for example, a sound volume control unit (not illustrated) that controls the sound volume of a sound signal acquired from another sound source depending on the distance r'. The configuration may be a recognition control unit (not illustrated) that stops the speech recognizing process in the speech recognition unit 110 when the distance r' is greater than a predetermined distance threshold value.

In this manner, according to this modification example, it is possible to detect the distance r' which corresponds to a sound source of speech based on the speech uttered under a reverberation environment without including hardware for detecting the distance. Various controls such as prediction of a recognition model can be carried out depending on the distance r'.

Here, the speech processing device (for example, the speech processing device 11a) according to this modification example includes the acoustic model prediction unit (for example, the acoustic model updating unit 111a) configured to predict an acoustic model corresponding to the distance indicated by the distance data selected by the reverberation characteristic selection unit (for example, the reverberation characteristic selection unit 106a) from the first acoustic model (for example, the reverbed acoustic model) trained using reverbed speech to which reverberations based on the reverberation characteristics corresponding to predetermined distances are added and the second acoustic model (for example, the clean acoustic model) trained using speech under an environment in which reverberations can be neglected, and the speech recognition unit (for example, the speech recognition unit 110) configured to perform a speech recognizing process on the dereverbed speech using the predicted acoustic model.

Accordingly, according to this modification example, since the acoustic model corresponding to the reverberation environment is predicted based on the distance selected from the clean acoustic model and the reverbed acoustic model and the speech recognizing process is performed using the predicted acoustic model, it is possible to improve the speech recognition accuracy.

In the above-mentioned embodiment, the reverberation characteristic combination unit 101 may perform multiplexing using a constant component (for example, the term of the coefficient α2 in Expression (3)) not dependent on the distance r' instead of or in addition to the component inversely proportional to the distance r' at the time of generating the reverberation characteristic $A'_{[r]}^{k\Delta}(\omega, r')$.

In the above-mentioned embodiment and modification example, when the number of microphones N of the sound collection unit 12 is 1, the use of the sound source separation unit 107 may be skipped.

The above-mentioned speech processing devices 11 and 11a may be incorporated into the sound collection unit 12.

In the above-mentioned embodiment, the likelihood calculation unit 1062 may select at least two out of the adaptive acoustic models $\pi_{[r]}^{k\Delta}$ stored in the reverberation model storage unit 1061 and may perform a prediction process on the selected adaptive acoustic model. In this prediction process, the likelihood calculation unit 1062 performs a weighting operation on the statistics constituting the selected adaptive acoustic model using the prediction coefficients indicating the contributions of the adaptive acoustic models. The likelihood calculation unit 1062 generates the adaptive acoustic model predicted from the statistics used for the weighting operation. In this case, the likelihood calculation unit 1062 calculates the likelihood of the feature amount T[u'] indicated by the feature amount data input from the feature amount calculation unit 108 based on the predicted adaptive acoustic model. The correction data reading unit 1063 selects a combination of the adaptive acoustic model and the prediction coefficient in which the calculated likelihood is the highest.

The correction data reading unit 1063 calculates the weighting parameter by performing the prediction process on the weighting parameters $\delta_{b,[r]}^{k\Delta}$ indicated by the correction data corresponding to the adaptive acoustic models of the selected combination using the selected prediction coefficient. The correction data reading unit 1063 outputs the correction data indicating the calculated weighting parameter to the dereverberation unit 109.

Accordingly, since the weighting parameters $\delta_{b,[r]}^{k\Delta}$ discretely set in advance are smoothed depending on the reverberation environment, it is possible to improve the dereverberation accuracy and to improve the speech recognition accuracy.

In the above-mentioned modification example, the likelihood calculation unit 1062 may select at least two out of the adaptive acoustic models $\pi_{[r]}^{k}$ stored in the reverberation model storage unit 1061a and may perform a prediction process on the selected adaptive acoustic model. The likelihood calculation unit 1062 calculates the likelihood of the feature amount T[u'] indicated by the feature amount data input from the feature amount calculation unit 108 based on the predicted adaptive acoustic model and selects a combination of the adaptive acoustic model and the prediction coefficient in which the calculated likelihood is the highest. The correction data reading unit 1063a calculates the weighting parameter by performing the prediction process on the weighting parameters $\delta_{b,[r]}^{k}$ indicated by the correction data corresponding to the adaptive acoustic models of the selected combination using the selected prediction coefficient, and outputs the correction data indicating the calculated weighting parameter to the dereverberation unit 109. Accordingly, it is possible to improve the dereverberation accuracy and to improve the speech recognition accuracy.

In the above-mentioned modification example, the correction data reading unit 1063a may calculate the distance by performing the prediction process using the coefficient used for the prediction process for the distance r' indicated by the distance data corresponding to the adaptive acoustic models of the selected combination and may output the distance data indicating the calculated distance to the acoustic model updating unit 111a.

Accordingly, since the distances discretely set in advance are smoothed depending on the reverberation environment, it is possible to improve the distance estimation accuracy and to improve the speech recognition accuracy by using the acoustic model predicted using the distance.

Parts of the speech processing devices 11 and 11a according to the above-mentioned embodiment and the modification example, for example, the reverberation characteristic combination units 101 and 101a, the speech signal acquisition unit 102, the reverberation unit 103, the acoustic model adaptation unit 104, the correction data generation unit 105, the reverberation characteristic selection units 106 and 106a, the sound source separation unit 107, the feature amount calculation unit 108, the dereverberation unit 109, the speech recognition unit 110, and the acoustic model updating unit 111a, may be embodied by a computer. In this case, the parts of the speech processing devices may be embodied by recording a program for performing the control functions on a computer-readable recording medium and reading and executing the program recorded on the recording medium into a computer system. Here, the "computer system" is a computer system incorporated into the speech processing device 11 or 11a and is assumed to include an OS or hardware such as peripherals. Examples of the "computer-readable recording medium" include portable mediums such as a flexible disk, a magneto-optical disk, a ROM, and a CD-ROM and a storage device such as a hard disk built in a computer system. The "computer-readable recording medium" may include a medium that dynamically holds a program for a short time like a communication line when a program is transmitted via a network such as the Internet or a communication circuit such as a telephone circuit or a medium that holds a program for a predetermined time like a volatile memory in a computer system serving as a server or a client in that case. The program may be configured to realize part of the above-mentioned functions or may be configured to realize the above-mentioned functions by combination with a program recorded in advance in a computer system.

All or part of the speech processing device 11 and 11a according to the above-mentioned embodiment and the modification example may be embodied by an integrated circuit such as a large scale integration (LSI) circuit. The functional blocks of the speech processing device 11 and 11a may be individually incorporated into processors, or a part or all thereof may be integrated and incorporated into a processor. The integration circuit technique is not limited to the LSI, but may be embodied by a dedicated circuit or a general-purpose processor. When an integration circuit technique appears as a substituent of the LSI with advancement in semiconductor technology, an integrated circuit based on the technique may be used.

While exemplary embodiments of the invention have been described and illustrated above in detail with reference to the accompanying drawings, the specific configurations are not limited to the above-mentioned configurations but can be modified in design in various forms without departing from the gist of the invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A speech processing device comprising:
a reverberation characteristic selection unit configured to correlate correction data indicating a contribution of a reverberation component based on a corresponding reverberation characteristic with an adaptive acoustic model which is trained using reverbed speech to which a reverberation based on the corresponding reverberation characteristic is added for each of reverberation characteristics, to calculate likelihoods based on the adaptive acoustic models for a recorded speech, and to select correction data corresponding to the adaptive acoustic model having the calculated highest likelihood;
a dereverberation unit configured to remove the reverberation component from the speech based on the correction data,
wherein the reverberation characteristics differ in the contribution of a component which is inversely proportional to a distance between a sound collection unit configured to record speech from a sound source and the sound source, and
wherein the reverberation characteristic selection unit correlates distance data indicating the distances corresponding to the reverberation characteristics with the correction data and the adaptive acoustic models and selects the distance data corresponding to the adaptive acoustic model having the calculated highest likelihood;
an acoustic model prediction unit configured to predict an acoustic model corresponding to the distance indicated by the distance data selected by the reverberation characteristic selection unit from a first acoustic model trained using reverbed speech to which a reverberation corresponding to the reverberation characteristic based on a predetermined distance is added and a second acoustic model trained using speech in an environment in which reverberations are negligible; and
a speech recognition unit configured to perform a speech recognizing process on the speech using the acoustic model predicted by the acoustic model prediction unit.

2. A speech processing method comprising:
a reverberation characteristic selecting step of calculating a likelihood for a recorded speech based on an adaptive acoustic model trained using reverbed speech to which a reverberation based on a corresponding reverberation characteristic is added for each of reverberation characteristics and selecting correction data corresponding to the adaptive acoustic model having the calculated highest likelihood from a storage unit in which the adaptive acoustic model and the correction data are stored in correlation for each of the reverberation characteristics;
a dereverbing step of removing a reverberation component from the speech based on the correction data,
wherein the reverberation characteristic selecting step differs in the contribution of a component which is inversely proportional to a distance between a sound collection unit configured to record speech from a sound source and the sound source, and
wherein the reverberation characteristic selecting step correlates distance data indicating the distances corresponding to the reverberation characteristics with the correction data and the adaptive acoustic models and selects the distance data corresponding to the adaptive acoustic model having the calculated highest likelihood;
an acoustic model prediction step of predicting an acoustic model corresponding to the distance indicated by the distance data selected by the reverberation characteristic selection unit from a first acoustic model trained using reverbed speech to which a reverberation corresponding to the reverberation characteristic based on a predetermined distance is added and a second acoustic model trained using speech in an environment in which reverberations are negligible; and
a speech recognition step of performing a speech recognizing process on the speech using the acoustic model predicted by the acoustic model prediction step.

3. A non-transitory computer-readable storage medium comprising a speech processing program causing a computer of a speech processing device to execute:
a reverberation characteristic selecting process of calculating a likelihood for a recorded speech based on an adaptive acoustic model trained using reverbed speech to which a reverberation based on a corresponding reverberation characteristic is added for each of reverberation characteristics and selecting correction data corresponding to the adaptive acoustic model having the calculated highest likelihood from a storage unit in which the adaptive acoustic model and the correction data are stored in correlation for each of the reverberation characteristics;
a dereverbing process of removing a reverberation component from the speech based on the correction data,
wherein the reverberation characteristics differ in the contribution of a component which is inversely proportional to a distance between a sound collection unit configured to record speech from a sound source and the sound source, and
wherein the reverberation characteristic selecting process correlates distance data indicating the distances corresponding to the reverberation characteristics with the correction data and the adaptive acoustic models and selects the distance data corresponding to the adaptive acoustic model having the calculated highest likelihood;
an acoustic model prediction process of predicting an acoustic model corresponding to the distance indicated by the distance data selected by the reverberation characteristic selecting process from a first acoustic model trained using reverbed speech to which a reverberation corresponding to the reverberation characteristic based on a predetermined distance is added and a second acoustic model trained using speech in an environment in which reverberations are negligible; and
a speech recognition process of performing a speech recognizing process on the speech using the acoustic model predicted by the acoustic model prediction process.

* * * * *